United States Patent
Urabe

(10) Patent No.: US 8,698,573 B2
(45) Date of Patent: Apr. 15, 2014

(54) IMPEDANCE STABILIZATION DEVICE

(75) Inventor: Yoshio Urabe, Kanagawa (JP)

(73) Assignee: Panasonic Corporation, Osaka (JP)

( * ) Notice: Subject to any disclaimer, the term of this patent is extended or adjusted under 35 U.S.C. 154(b) by 276 days.

(21) Appl. No.: 13/321,352

(22) PCT Filed: Apr. 12, 2011

(86) PCT No.: PCT/JP2011/002174
§ 371 (c)(1),
(2), (4) Date: Nov. 18, 2011

(87) PCT Pub. No.: WO2011/129104
PCT Pub. Date: Oct. 20, 2011

(65) Prior Publication Data
US 2012/0086517 A1   Apr. 12, 2012

(30) Foreign Application Priority Data

Apr. 12, 2010   (JP) .................................. 2010-091571
Apr. 12, 2010   (JP) .................................. 2010-091572

(51) Int. Cl.
*H03H 7/38*   (2006.01)
*H04B 3/54*   (2006.01)

(52) U.S. Cl.
USPC .............................. 333/32; 333/124; 340/538

(58) Field of Classification Search
USPC ........................ 333/32, 124; 340/538, 538.14
See application file for complete search history.

(56) References Cited

U.S. PATENT DOCUMENTS 6,987,430 B2 *   1/2006   Wasaki et al. ................. 333/124
7,501,913 B2   3/2009   Hanada et al.
2007/0190840 A1   8/2007   Hanada et al.
2008/0224536 A1   9/2008   Yamazaki
2008/0291005 A1   11/2008   Yukizane et al.
2009/0128250 A1 *   5/2009   Roblot et al. ................... 333/32
2010/0151701 A1   6/2010   Yamashita

FOREIGN PATENT DOCUMENTS

| CN | 1556590 | 12/2004 |
|---|---|---|
| CN | 101267229 | 9/2008 |
| CN | 101471699 | 7/2009 |
| JP | 9-185795 | 7/1997 |
| JP | 2002-217797 | 8/2002 |

(Continued)

OTHER PUBLICATIONS

International Search Report issued Jun. 7, 2011 in International (PCT) Application No. PCT/JP2011/002174.

(Continued)

*Primary Examiner* — Stephen Jones
(74) *Attorney, Agent, or Firm* — Wenderoth, Lind & Ponack, L.L.P.

(57) ABSTRACT

Provided is an impedance stabilization device having a configuration in which a circuit including a series matching impedance element (11*a* and 12*a* (11*b* and 12*b*)) and a high-frequency blocking element connected in parallel is inserted in series into at least one of lines (10*a* (10*b*)) constituting a power line, and the lines (10*a* and 10*b*) are connected via another circuit including a parallel matching impedance element (13) and a low-frequency matching element (14) connected in series. A high-frequency signal passes through the series matching impedance element, a power current passes through the high-frequency blocking element, and the parallel matching impedance element functions as a termination resistor when a terminal on an equipment side is an open end.

13 Claims, 25 Drawing Sheets

(56) References Cited

FOREIGN PATENT DOCUMENTS

| | | |
|---|---|---|
| JP | 2003-249879 | 9/2003 |
| JP | 2007-88695 | 4/2007 |
| JP | 2007-124123 | 5/2007 |
| JP | 2007-221358 | 8/2007 |
| WO | 2007/046438 | 4/2007 |
| WO | 2010/100951 | 9/2010 |
| WO | 2010/100952 | 9/2010 |

OTHER PUBLICATIONS

Chinese Office Action issued Oct. 9, 2013 in Chinese Application No. 201180002397.2 along with partial English translation.

* cited by examiner

FIG. 3

| $R_{S1}$ | $R_{S2}$ | $R_P$ | VSWRmax | Loss (dB) |
|---|---|---|---|---|
| $0.54Z_0$ | $0.54Z_0$ | $0.66Z_0$ | 1.2 | 10.5 |
| $0.27Z_0$ | $0.27Z_0$ | $1.73Z_0$ | 2.0 | 4.8 |
| $0.17Z_0$ | $0.17Z_0$ | $2.83Z_0$ | 3.0 | 3.0 |

FIG. 6

| $R_{S1}$ | $R_P$ | VSWRmax | Loss (dB) |
|---|---|---|---|
| $0.83Z_0$ | $0.37Z_0$ | 1.2 | 12.2 |
| $0.50Z_0$ | $1.50Z_0$ | 2.0 | 5.3 |
| $0.33Z_0$ | $2.67Z_0$ | 3.0 | 3.3 |

IMPEDANCE STABILIZATION DEVICE

TECHNICAL FIELD

This application claims the benefits of priority from Japanese Patent Application No. 2010-091571 and Japanese Patent Application No. 2010-091572, each filed on Apr. 12, 2010, the disclosure of which, including the claims, description, drawings and abstract, is incorporated herein by reference in its entirety.

The present invention relates to an impedance stabilization device for use in power line communication.

BACKGROUND ART

In recent years, a system for performing power line communication has been in practical use. In the power line communication, high-frequency signals are superimposed on a power line (also referred to as a distribution line). The power line communication is performed using an existing power line without the need for installation of dedicated wiring to build an indoor communication network, and therefore is expected to become increasingly popular. Power distribution systems, however, are normally not designed for use in communication. Therefore, the power line communication can cause an impedance mismatch to a line (wiring) at an end of the power distribution system (socket). Once the impedance mismatch is caused, reflection of high-frequency signals used in the power line communication occurs at a point where the mismatch is caused. The reflection of high-frequency signals leads to frequency selective fading that can result in a problem of channel characteristic degradation in the power line communication.

As a power line for use in interior distribution, a power line having characteristic impedance on the order of approximately 100 ohms is generally used.

When a household electrical appliance having impedance of a few ohms to high-frequency signals is connected to a socket at the end of the power distribution system, the impedance of the socket becomes extremely lower than the characteristic impedance of a power line. On the other hand, when no electronic equipment is connected to the socket, the end becomes an open end. In such a case, the impedance of the socket becomes extremely higher than the characteristic impedance of the power line. Accordingly, a mismatch occurs between the impedance to high-frequency signals in a case where the socket is the open end and the impedance to the high-frequency signals in a case where the socket is not the open end, at the end of the power distribution system (socket). As a result, intense reflection of high-frequency signals occurs, and thus channel characteristic in the power line communication is degraded.

In order to prevent such channel characteristic degradation, a termination circuit for reducing the impedance mismatch at the socket or the like is disclosed (see Patent Literature 1).

FIG. 25 illustrates a configuration of the termination circuit disclosed in Patent Literature 1. The configuration of the termination circuit illustrated in FIG. 25 is as follows: an inductor 2503 is directly connected to a line (power line), and a circuit including a termination resistor 2501 and a capacitor (condenser) 2502 connected in series is connected in parallel with the line. Here, as the termination resistor 2501, a resistor having resistance approximately equal to the characteristic impedance of the line is used. Used as the capacitor 2502 is a capacitor having sufficiently lower impedance than the characteristic impedance of the line to a high-frequency signal for use in the power line communication, and having sufficiently higher impedance than the characteristic impedance of the line to a power current (e.g. an alternating current of 50 Hz and 60 Hz, and a direct current). Used as the inductor 2503 is an inductor having sufficiently higher impedance than the characteristic impedance of the line to the high-frequency signal, and having sufficiently lower impedance than the characteristic impedance of the line to the power current.

The high-frequency signal from a line (wiring) side is provided to the circuit including the termination resistor 2501 and the capacitor 2502 connected in series, and output from a signal input-output terminal 2504. The line (wiring) side and a socket side, to which electronic equipment is connected, are separated from each other by the inductor 2503 having high characteristic impedance to the high-frequency signal. Therefore, even when a high-frequency impedance of the electronic equipment connected to the socket is low, the effect thereof is negligible. As described above, the termination circuit disclosed in Patent Literature 1 has impedance approximately equal to the characteristic impedance of the line to the high-frequency signal, regardless of whether or not any equipment is connected to the socket. Therefore, the impedance mismatch at the end is reduced, and reflection of the high-frequency signals is suppressed.

CITATION LIST

Patent Literature

[Patent Literature 1]
Japanese Patent Application Publication No. 2002-217797

SUMMARY OF INVENTION

Technical Problem

The problem is that the termination circuit disclosed in Patent Literature 1 cannot be used with the power line communication equipment connected to the socket, as the high-frequency signal does not arrive at the socket side in the termination circuit as describe above. Therefore, it is necessary to provide two terminals, namely a terminal for receiving power and a terminal for receiving high-frequency signals (the signal input-output terminal 2504), to the termination circuit disclosed in Patent Literature 1.

That is to say, the same socket cannot be used for both of the household electrical appliance and the power line communication equipment in the termination circuit disclosed in Patent Literature 1. Therefore, with the technology disclosed in Patent Literature 1, it is necessary to use another socket to which the termination circuit is not provided. This makes the termination circuit less convenient. Another problem is that the power line communication equipment becomes unable to establish communication when being connected not to the signal input-output terminal 2504 but to the socket by mistake.

The present invention has been conceived in view of such problems. A purpose of the present invention is to provide an impedance stabilization device that can be used when the household electrical appliance is connected to the terminal (socket) and when the power line communication equipment is connected to the same terminal, while reducing the impedance mismatch regardless of whether or not electronic equipment is connected to the socket.

Solution to Problem

In order to solve the above-presented problems, one aspect of the present invention is an impedance stabilization device used for power line communication performed by superimposing a high-frequency signal on a power line composed of at least two lines, the impedance stabilization device comprising: a first circuit that includes a first impedance element and a high-frequency blocking element connected in parallel, and is inserted into at least one of the lines; and a second circuit that includes a second impedance element and a low-frequency blocking element connected in series, and via which the lines are connected, wherein the high-frequency blocking element has higher impedance than impedance of the first impedance element to the high-frequency signal, and has lower impedance than impedance of the first impedance element to one of a low-frequency alternating current and a direct current supplied to the power line, and the low-frequency blocking element has lower impedance than impedance of the second impedance element to the high-frequency signal, and has higher impedance than impedance of the second impedance element to one of the low-frequency alternating current and the direct current.

Advantageous Effects of Invention

With the above-mentioned configuration, the impedance stabilization device unifies the input-output terminal of the socket by providing a path of a power current and a path of a high-frequency signal, and reduces the impedance mismatch occurring when no equipment is connected to the socket and when equipment having low high-frequency impedance is connected to the socket, using the parallel matching impedance element.

BRIEF DESCRIPTION OF DRAWINGS

FIG. 3 shows examples of combinations of impedance of each element included in the impedance stabilization device 1.

FIG. 6 shows examples of combinations of impedance of each element included in the impedance stabilization device 50.

FIG. 16 is a circuit diagram illustrating an example of a specific configuration of an impedance stabilization device 1a.

FIG. 18 is a circuit diagram illustrating an example of a specific configuration of an impedance stabilization device 50a.

FIG. 19 is a circuit diagram illustrating an example of a specific configuration of an impedance stabilization device 70a.

DESCRIPTION OF EMBODIMENTS

Figure 1:
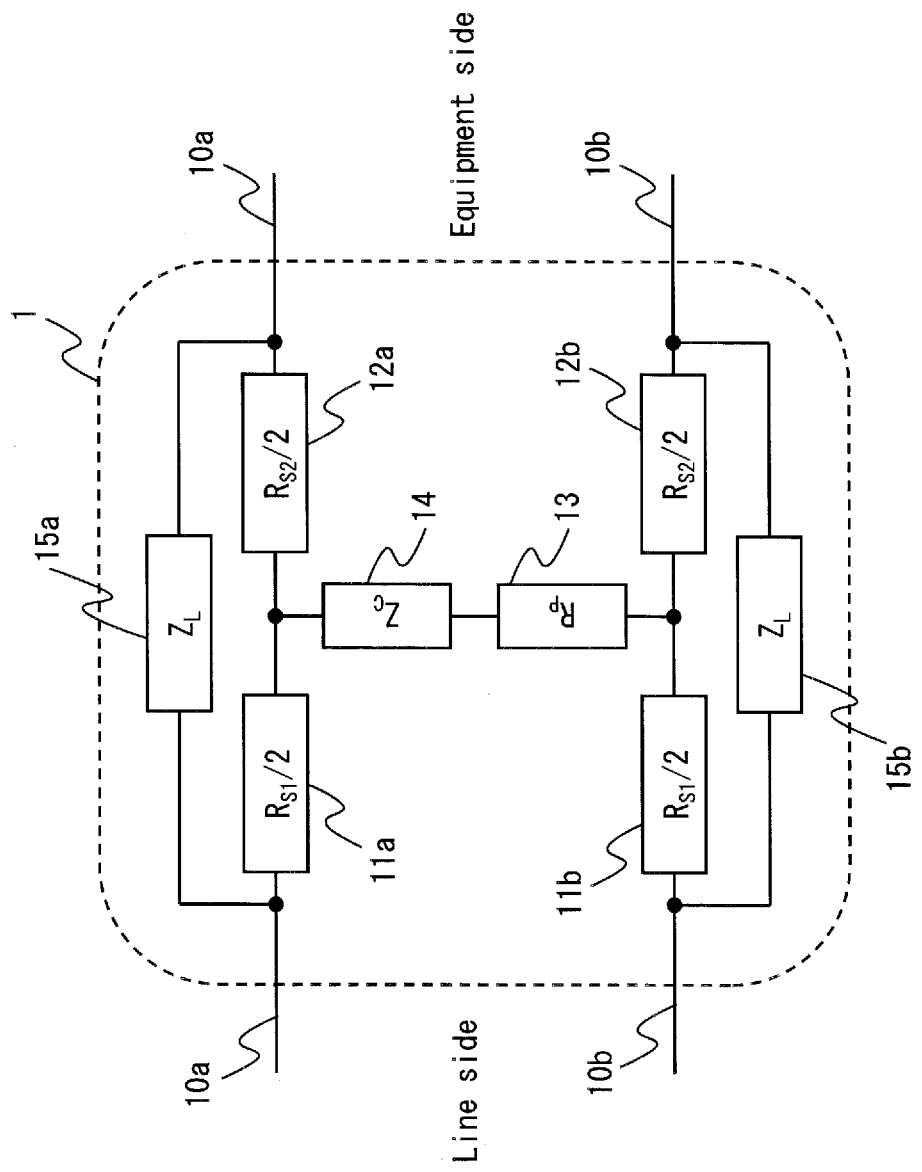
FIG. 1 illustrates a configuration of the impedance stabilization device 1 in Embodiment 1.

One aspect of the present invention is a first impedance stabilization device that is an impedance stabilization device used for power line communication performed by superimposing a high-frequency signal on a power line composed of at least two lines, the impedance stabilization device comprising: a first circuit that includes a first impedance element and a high-frequency blocking element connected in parallel, and is inserted into at least one of the lines; and a second circuit that includes a second impedance element and a low-frequency blocking element connected in series, and via which the lines are connected, wherein the high-frequency blocking element has higher impedance than impedance of the first impedance element to the high-frequency signal, and has lower impedance than impedance of the first impedance element to one of a low-frequency alternating current and a direct current supplied to the power line, and the low-frequency blocking element has lower impedance than impedance of the second impedance element to the high-frequency signal, and has higher impedance than impedance of the second impedance element to one of the low-frequency alternating current and the direct current.

The first impedance stabilization device unifies the input-output terminal of the socket by providing a path of a power current and a path of the high-frequency signal, and reduces the impedance mismatch occurring when no equipment is connected to the socket and when equipment having low high-frequency impedance is connected to the socket, using the parallel matching impedance element.

Another aspect of the present invention is a second impedance stabilization device that is the first impedance stabilization device, wherein the first impedance element comprises two elements connected in series, and one end of the second circuit is connected to a point between the two elements.

Another aspect of the present invention is a third impedance stabilization device that is the second impedance stabilization device, wherein the first circuit is inserted into each of the lines, so that the lines are balanced with respect to a ground. Note that the ground is also referred to as "earth" in the field of electric circuits.

Furthermore, another aspect of the present invention is a fourth impedance stabilization device that is the third impedance stabilization device, wherein the one end of the second circuit is connected to a point between the two elements of the first impedance element included in the first circuit inserted into one of the lines, and the other end of the second circuit is connected to a point between the two elements of the first impedance element included in the first circuit inserted into another one of the lines.

With the above-mentioned configurations, the impedance stabilization device increases the balance level of the two lines constituting the power line to the ground, and thus suppresses the leakage of radio waves from equipment connected to the socket.

Another aspect of the present invention is a fifth impedance stabilization device that is the first impedance stabilization device, wherein impedance of the first impedance element is 0.3 to 1.2 times higher than characteristic impedance of the lines.

Another aspect of the present invention is a sixth impedance stabilization device that is the first impedance stabilization device, wherein impedance of the second impedance element is 0.6 to 3 times higher than characteristic impedance of the lines.

By setting the impedance of the series matching impedance element and the impedance of the parallel matching impedance element as mentioned above, the impedance stabilization device reduces the impedance mismatch to suppress the reflection of high-frequency signals as much as possible and decreases the signal loss.

Another aspect of the present invention is a seventh impedance stabilization device that is the first impedance stabilization device being provided in power distribution equipment having a source connector and a feed connector, wherein the second circuit further includes a switch connected in series with either the second impedance element or the low-frequency blocking element, and the switch closes while no wiring is connected to the feed connector, and opens while wiring is connected to the feed connector.

With this configuration, the impedance stabilization device is applicable to the power distribution system having the daisy-chain configuration.

Another aspect of the present invention is an eighth impedance stabilization device that is the first impedance stabilization device being provided in power distribution equipment having a source connector and a feed connector, wherein the second circuit further includes a switch connected in series with either the second impedance element or the low-frequency blocking element, and the switch closes while no wiring is connected to at least one of the source connector and the feed connector, and opens while wiring is connected to each of the source connector and the feed connector.

With this configuration, it is possible to provide an impedance stabilization device that is applicable to the power distribution system having the daisy-chain configuration, and is easily installed regardless of direction in which the impedance stabilization device is connected.

Another aspect of the present invention is a ninth impedance stabilization device that is an impedance stabilization device used for power line communication performed by superimposing a high-frequency signal on a power line composed of at least two lines, and provided in power distribution equipment having a feed connector, the impedance stabilization device comprising: a first circuit that includes an impedance element, a low-frequency blocking element and a switch connected in series, and via which the lines are connected; and an impedance upper circuit that is inserted between an equipment connector and the lines, wherein the low-frequency blocking element has lower impedance than impedance of the impedance element to the high-frequency signal, and has higher impedance than impedance of the impedance element to one of a low-frequency alternating current and a direct current supplied to the power line, the impedance upper circuit has impedance that is equal to or higher than characteristic impedance of the lines to the high-frequency signal, and has lower impedance than characteristic impedance of the lines to one of the low-frequency alternating current and the direct current, and the switch closes while no wiring is connected to the feed connector, and opens while wiring is connected to the feed connector.

With this configuration using the impedance upper circuit, it is possible to provide an impedance stabilization device that is applicable to the power distribution system having the daisy-chain configuration and reduces the impedance mismatch.

Another aspect of the present invention is a tenth impedance stabilization device that is an impedance stabilization device used for power line communication performed by superimposing a high-frequency signal on a power line composed of at least two lines, and provided in power distribution equipment having a source connector and a feed connector, the impedance stabilization device comprising: a first circuit that includes an impedance element, a low-frequency blocking element and a switch connected in series, and via which the lines are connected; and an impedance upper circuit that is inserted between an equipment connector and the lines, wherein the low-frequency blocking element has lower impedance than impedance of the impedance element to the high-frequency signal, and has higher impedance than impedance of the impedance element to one of a low-frequency alternating current and a direct current supplied to the power line, the impedance upper circuit has impedance that is equal to or higher than characteristic impedance of the lines to the high-frequency signal, and has lower impedance than characteristic impedance of the lines to one of the low-frequency alternating current and the direct current, and the switch closes while no wiring is connected to at least one of the source connector and the feed connector, and opens while wiring is connected to each of the source connector and the feed connector.

With this configuration using the impedance upper circuit, it is possible to provide an impedance stabilization device that reduces the impedance mismatch, is applicable to the power distribution system having the daisy-chain configuration, and is connected in any direction.

Another aspect of the present invention is an eleventh impedance stabilization device that is the seventh or the eighth impedance stabilization device, wherein at least part of the impedance upper circuit doubles as the impedance element.

With this configuration, the number of elements required to be included in the impedance stabilization device is reduced as it is unnecessary to provide another element serving as a matching impedance element.

Yet another aspect of the present invention is a twelfth impedance stabilization device that is an impedance stabilization device used for power line communication performed by superimposing a high-frequency signal on a power line composed of at least two lines, the impedance stabilization device comprising: a first impedance element that is inserted into at least one of the lines; a second impedance element that connects the lines; a high-frequency blocking element that is inserted into at least one of a first line and a second line other than the at least two lines, the first line being connected to the at least one line into which the first impedance element is inserted so as to bridge the first impedance element and to be in parallel with the at least one line into which the first impedance element is inserted, the second line being connected to another line to which the first line is not connected so as to bridge a point where the second impedance element connects to the other line and to be in parallel with the other line to which the first line is not connected; and a low-frequency blocking element that connects the first and second lines, wherein the high-frequency blocking element has higher impedance than impedance of the first impedance element to the high-frequency signal, and has lower impedance than impedance of the first impedance element to one of a low-frequency alternating current and a direct current supplied to the power line, and the low-frequency blocking element has lower impedance than impedance of the second impedance element to the high-frequency signal, and has higher impedance than impedance of the second impedance element to one of the low-frequency alternating current and the direct current.

The twelfth impedance stabilization device unifies the input-output terminal of the socket by providing a path of a power current and a path of the high-frequency signal, and reduces the impedance mismatch occurring when no equipment is connected to the socket and when equipment having low high-frequency impedance is connected to the socket, using the parallel matching impedance element.

Embodiment 1

The following describes an impedance stabilization device in Embodiment 1 of the present invention, with reference to the drawings.

FIG. 1 is a block diagram illustrating a configuration of an impedance stabilization device 1.

As illustrated in FIG. 1, the impedance stabilization device 1 is inserted between a line (power source) side and an equipment (communication equipment or household electrical appliance) side. In a power distribution system, a power line is basically composed of two lines, and the impedance stabilization device 1 is connected to the lines in the vicinity of a socket.

The impedance stabilization device 1 includes series matching impedance elements 11a, 11b, 12a and 12b, a parallel matching impedance element 13, a low-frequency blocking element 14, and high-frequency blocking elements 15a and 15b.

As illustrated in FIG. 1, the series matching impedance element 11a is connected in series with the series matching impedance element 12a, and the high-frequency blocking element 15a is connected in parallel with the impedance elements 11a and 12a connected in series. The series matching impedance elements 11a and 12a and the high-frequency blocking element 15a constitute a first circuit, and the first circuit is inserted into a line 10a. Note that, in the present description, the term "series" in the series matching impedance element indicates that the series matching impedance element is inserted in series into the line. Also, the term "matching" generally indicates that the impedance of the line side matches the impedance of the equipment side. In the present description, however, the term "matching" indicates that the impedance of the line side matches the impedance of the equipment side as much as possible, and therefore they may not match perfectly as long as the purpose of the present invention is achieved.

The series matching impedance element 11b is connected in series with the series matching impedance element 12b, and the high-frequency blocking element 15b is connected in parallel with the impedance elements 11b and 12b connected in series. The series matching impedance elements 11b and 12b and the high-frequency blocking element 15b constitute another first circuit, and the other first circuit is inserted into a line 10b.

A second circuit including the parallel matching impedance element 13 and the low-frequency blocking element 14 connected in series is inserted so as to connect the two lines 10a and 10b. Note that, in the present description, the term "parallel" in the parallel matching impedance element indicates that, when any equipment is connected to a terminal at the equipment side, the parallel matching impedance element is parallel with the connected equipment.

As each of the series matching impedance elements 11a, 11b, 12a and 12b and the parallel matching impedance element 13, a resistance element is typically used.

As the low-frequency blocking element 14, a capacitor is typically used. As each of the high-frequency signal blocking elements 15a and 15b, an inductor is typically used.

The high-frequency blocking elements 15a and 15b are configured to have sufficiently lower impedance than the impedance of the series matching impedance elements 11a, 11b, 12a and 12b to one of a low-frequency alternating current (e.g. 50 Hz and 60 Hz) and a direct current. On the other hand, the low-frequency blocking element 14 is configured to have sufficiently higher impedance than the impedance of the series matching impedance elements 11a, 11b, 12a and 12b to one of a low-frequency alternating current (e.g. 50 Hz and 60 Hz) and a direct current.

Here, the expression "sufficiently" in the sentence "the high-frequency blocking elements 15a and 15b are configured to have sufficiently lower impedance than the impedance of the series matching impedance elements 11a, 11b, 12a and 12b to one of a low-frequency alternating current (e.g. 50 Hz and 60 Hz) and a direct current" indicates that the impedance of the high-frequency blocking elements 15a and 15b is low to the extent that a power current cannot flow through the series matching impedance elements 11a, 11b, 12a and 12b, and mainly flows through the high-frequency blocking elements 15a and 15b. In other words, the high-frequency blocking elements 15a and 15b have negligible impedance compared to the series matching impedance elements 11a, 11b, 12a and 12b to one of a low-frequency alternating current (e.g. 50 Hz and 60 Hz) and a direct current. Also, the expression "sufficiently" in the sentence "the low-frequency blocking element 14 is configured to have sufficiently higher impedance than the impedance of the series matching impedance elements 11a, 11b, 12a and 12b to one of a low-frequency alternating current (e.g. 50 Hz and 60 Hz) and a direct current" indicates that the impedance of the low-frequency blocking element 14 is high to the extent that a power current can rarely flow through the low-frequency blocking element 14. In other words, the series matching impedance elements 11a, 11b, 12a and 12b have negligible impedance compared to the low-frequency blocking element 14 to one of a low-frequency alternating current (e.g. 50 Hz and 60 Hz) and a direct current.

With such a configuration, the power current is supplied to the equipment side through the high-frequency blocking element 15 and rarely flows through the series matching impedance elements 11a, 11b, 12a and 12b and the parallel matching impedance element 13. Therefore, a loss of the power current (e.g. an alternating current of 50 Hz and 60 Hz and a direct current) rarely occurs in the impedance stabilization device 1.

In contrast, the high-frequency blocking elements 15a and 15b are configured to have sufficiently higher impedance than the impedance of the series matching impedance elements 11a, 11b, 12a and 12b to a high-frequency signal. Also, the low-frequency blocking element 14 has sufficiently lower impedance than the impedance of the parallel matching impedance element 13 to a high-frequency signal.

Here, the expression "sufficiently" in the sentence "the high-frequency blocking elements 15a and 15b are configured to have sufficiently higher impedance than the impedance of the series matching impedance elements 11a, 11b, 12a and 12b to a high-frequency signal" indicates that the impedance of the high-frequency blocking element 15a and 15b is high to the extent that a high-frequency signal can rarely flow through the high-frequency blocking element 15a and 15b, and mainly flows through the series matching impedance elements 11a, 11b, 12a and 12b. In other words, the series matching impedance elements 11a, 11b, 12a and 12b have negligible impedance compared to the high-frequency blocking elements 15a and 15b to a high-frequency signal. Also, the expression "sufficiently" in the sentence "the low-frequency blocking element 14 has sufficiently lower impedance than the impedance of the parallel matching impedance element 13 to a high-frequency signal" indicates that the impedance of the low-frequency blocking element 14 is low to the extent that a high-frequency signal flows through the low-frequency blocking element 14. In other words, the low-frequency blocking element 14 has negligible impedance compared to the parallel matching impedance element 13 to a high-frequency signal.

Figure 2B:
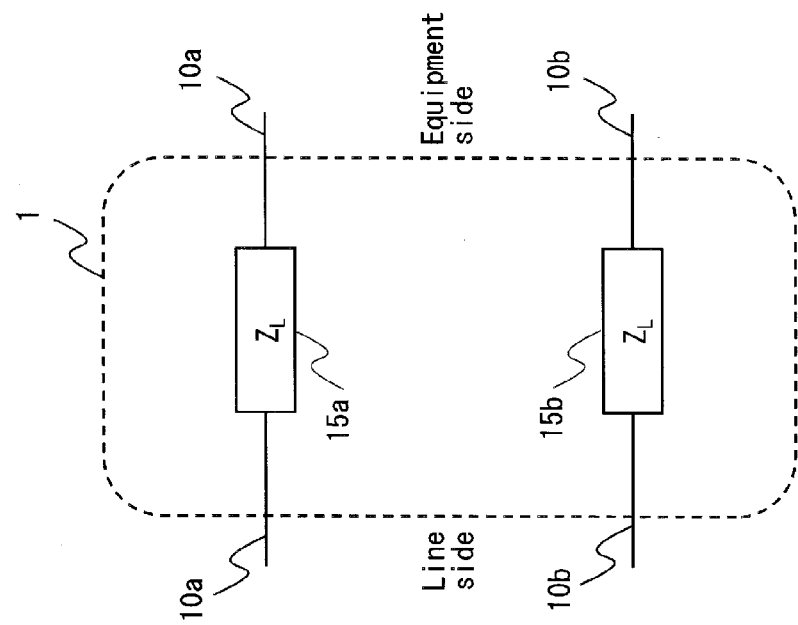
FIG. 2B illustrates an equivalent configuration of the impedance stabilization device 1 to a power current.
Figure 2A:
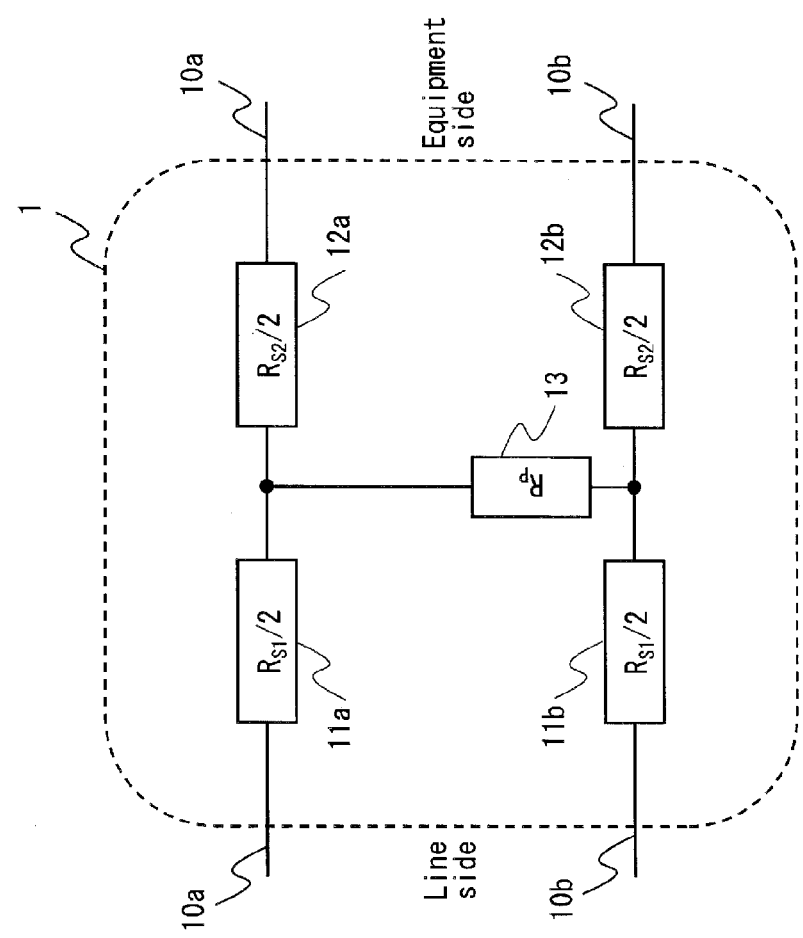
FIG. 2A illustrates an equivalent configuration of the impedance stabilization device 1 to a high-frequency signal.
Figure 4:
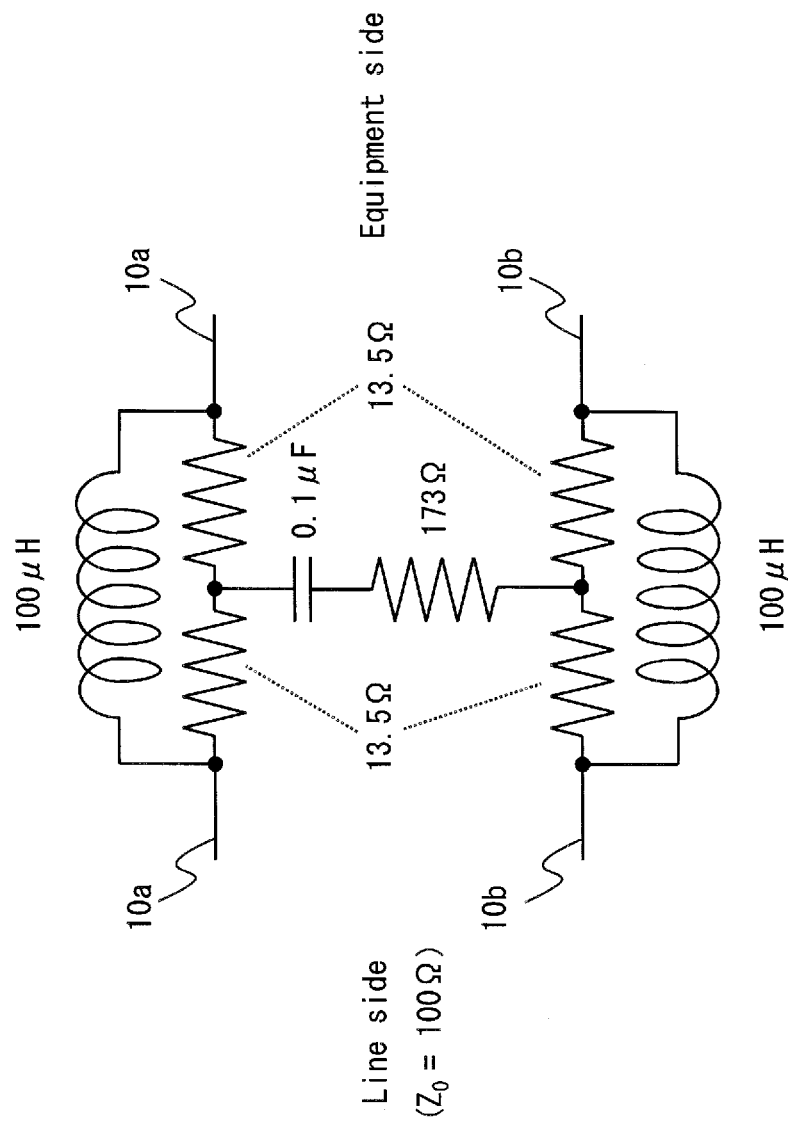
FIG. 4 is a circuit diagram illustrating an example of a specific configuration of the impedance stabilization device 1.

Therefore, a configuration of the impedance stabilization device 1 to a high-frequency signal is represented by an approximate equivalent circuit as illustrated in FIG. 2A including only the series matching impedance elements 11a, 11b, 12a and 12b, and the parallel matching impedance 13. Similarly, a configuration of the impedance stabilization device 1 to one of a low-frequency alternating current (e.g. 50 Hz and 60 Hz) and a direct current is represented by an approximate equivalent circuit as illustrated in FIG. 2B including only the high-frequency blocking elements 15a and 15b.

That is to say, the impedance stabilization device 1 has a configuration in which a path of a high-frequency signal (a path running through the series matching impedance elements 11a, 11b, 12a and 12b) is connected in parallel with a path of a low-frequency signal, namely the power current (a path running through the high-frequency blocking elements 15a and 15b). With such a configuration, both of the signals are transmitted to a common output terminal, namely the socket.

Note that, although the impedance stabilization device 1 in Embodiment 1 has a configuration in which a series matching impedance element is connected in series with each of the lines 10a and 10b, the impedance stabilization device 1 may have a configuration in which the series matching impedance element is connected with only one of the lines 10a and 10b. However, imbalance between the two lines 10a and 10b to the ground can cause leakage of radio waves as a possibility of generating a common mode current increases. In order to prevent such a problem, in the impedance stabilization device 1 in Embodiment 1, the series matching impedance elements 11a and 12a are each connected to the line 10a and the series matching impedance elements 11b and 12b are each connected to the line 10b so that the lines 10a and 10b are balanced to the ground, as illustrated in FIG. 1. With such a configuration, a balance level of the impedance stabilization device 1 is maintained at a high level and the leakage of radio waves is suppressed.

The following describes a desirable value that each impedance element and the like should take at the end of the power distribution system, i.e. the impedance stabilization device 1, in order not to cause the mismatch on a line. For the sake of simplicity, the description is made using a configuration illustrated in FIG. 2A, which is an equivalent circuit of the impedance stabilization device 1 to a high-frequency signal.

First, in a case where no equipment is connected to a terminal on the equipment side, i.e., in a case where no equipment is connected to the socket and thus the socket is an open end, the impedance of the impedance stabilization device 1 on the line side is expressed in Equation (1) shown below.

[Equation 1]

$$Z_{OPEN} = R_{S1} + R_P \tag{1}$$

In a case where the terminal on the equipment side is an open end, a high-frequency signal flows through the series matching impedance element 11a, the parallel matching impedance element 13 and the series matching impedance element 11b.

In Equation (1), $R_{S1}$ represents total impedance of elements connected to the lines 10a and 10b in this case (the series matching impedance element 11a and the series matching impedance element 11b). The impedance of the series matching impedance elements 12a and 12b is negligible as the terminal on the equipment side is an open end and thus a signal does not flow through these elements.

Also, in Equation (1) shown above, $R_P$ represents total impedance of elements included in a second circuit connecting the lines 10a and 10b (the parallel matching impedance element 13). Note that, in the case shown in FIG. 1, $R_P$ represents total impedance of the parallel matching impedance element 13 and the low-frequency blocking element 14. The impedance of the low-frequency blocking element 14 to a high-frequency signal, however, is negligible.

In a case where the impedance stabilization device 1 is short-circuited to a high-frequency signal as equipment having an extremely low high-frequency impedance is connected to the terminal on the equipment side, namely the socket, the impedance of the impedance stabilization device 1 on the line side is expressed in Equation (2) shown below.

[Equation 2]

$$Z_{SHORT} = R_{S1} + \frac{R_{S2} \times R_P}{R_{S2} + R_P} \tag{2}$$

In Equation (2) shown above, $R_{S1}$ represents total impedance of the series matching impedance elements 11a and 11b. Also, $R_{S2}$ represents total impedance of the series matching impedance elements 12a and 12b. $R_P$ represents impedance of the parallel matching impedance element.

The amplitude of a reflected wave is generally represented by VSWR (Voltage Standing Wave Ratio). The value of VSWR of "1" indicates that the reflection does not occur. Therefore, VSWR can be used as an indicator of a degree of the impedance mismatch.

In the case where the terminal on the equipment side is an open end, VSWR of the impedance stabilization device 1 on the line side is represented as $Z_{OPEN}/Z_0$ (hereinafter, referred to as "$VSWR_{OPEN}$") using $Z_{OPEN}$, which is calculated using Equation (1) shown above, and $Z_0$, which is characteristic impedance of the line. On the other hand, in the case where the impedance stabilization device 1 is short-circuited as an household electrical appliance having an extremely low high-frequency impedance is connected to the terminal on the equipment side, VSWR of the impedance stabilization device 1 on the line side is represented as $Z_{SHORT}/Z_0$ (hereinafter, referred to as "$VSWR_{SHORT}$") using $Z_{SHORT}$, which is calculated using Equation (2) shown above, and $Z_0$, which is the characteristic impedance of the line.

When the higher of values $VSWR_{OPEN}$ and $VSWR_{SHORT}$ is referred to as $VSWR_{MAX}$ in a case where an impedance value of each element is the same, $VSWR_{MAX}$ is used as the indicator of a degree of the impedance mismatch occurring in the impedance stabilization device 1 as described above. That is to say, the closer the value of $VSWR_{MAX}$ is to 1, the more stable the impedance is and the less the impedance mismatch occurs when a load is connected. Therefore, the reflection is suppressed.

Accordingly, in order to bring the value of $VSWR_{MAX}$ closer to "1", it is desirable that the impedance value of each matching impedance element (11a, 11b, 12a, 12b and 13) be set so that each of the values of $VSWR_{OPEN}$ and $VSWR_{SHORT}$ is brought closer to "1".

Also, as described above, there are requirements that should be met in order for both of the high-frequency signal and the power current to reach the equipment side. An example of the impedance value of each matching impedance element set so as to meet the requirements is shown in FIG. 3, together with the value of $VSWR_{MAX}$ and signal loss associated with the impedance value.

As can be seen from a table shown in FIG. 3, as the value of $VSWR_{MAX}$ decreases, the signal loss increases. That is to say, the value of VSWR and the signal loss are traded off.

It is generally known that, when the value of VSWR is equal to or lower than "2", characteristic degradation is sufficiently prevented. It is also known that, even when the value of VSWR is approximately "3", characteristics are significantly improved compared with a case where the terminal on the equipment side is an open end and a case where the impedance stabilization device 1 is short-circuited. Therefore, in Embodiment 1, the impedance value of each impedance element is set so that the value of $VSWR_{MAX}$ is equal to or lower than "3".

In order not to greatly degrade the communication performance, it is preferable that the signal loss be approximately equal to or lower than 3 dB. It is possible, however, to establish communication when a required value of S/N (Signal-to-Noise ratio) is met within a dynamic range of a receiver. For example, in a case of in-home power line communication, in which the signal loss is approximately 30 dB, a communication signal having the S/N value of 80 dBμV/10 kHz at a transmission point has the S/N value of 50 dBμV/10 kHz at a reception point. An average noise level of a home appliance or the like on a power line is approximately 20 to 30 dBμV. Therefore, the S/N value at the reception point will become 20 to 30 dB. When the required S/N value for establishing communication is 10 dB, the impedance value of each impedance element is set so that the signal loss occurring in the impedance stabilization device 1 is approximately equal to or lower than 10 dB.

Therefore, the impedance value of each impedance element included in the impedance stabilization device 1 is set, with reference to the table shown in FIG. 3 in view of the above, as follows:

Total impedance of the series matching impedance elements (total impedance of the series matching impedance elements 11a, 11b, 12a and 12b) is 0.3 (0.17+0.17) to 1.2 (0.54+0.54) times higher than the characteristic impedance of the line; and Impedance of the parallel matching impedance element is 0.6 to 3 times higher than the characteristic impedance of the line.

These are the requirements that each impedance value should meet.

The table in FIG. 3 shows the values of $VSWR_{MAX}$ and the signal losses in a case where the impedance stabilization device 1 is configured so that the value of $R_{S1}$ is equivalent to the value of $R_{S2}$. This is to increase stability of the impedance stabilization device by equalizing a balance level of the line side and that of the equipment side to the ground as much as possible, as described above. The value of $R_{S1}$, however, may not be equivalent to the value of $R_S$ as long as the purpose of the present invention (i.e. to unify a terminal for outputting a power current and a terminal for outputting a high-frequency signal, and to reduce the impedance mismatch occurring in the impedance stabilization device 1) is achieved.

That is to say, the value of $R_{S1}$ may be higher than that of $R_{S2}$ and vice versa. Alternatively, one of the values of $R_{S1}$ and $R_{S2}$ may be set to "0".

Figure 5:
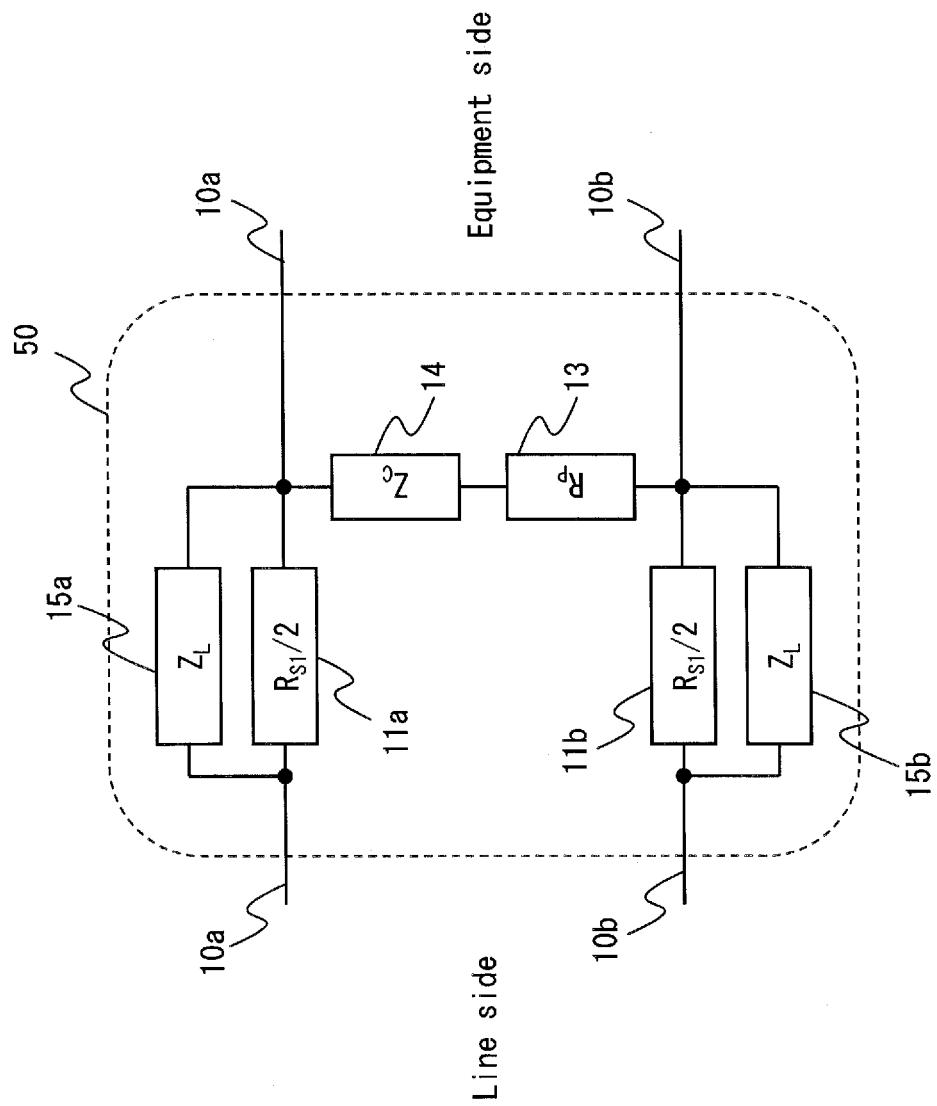
FIG. 5 illustrates a configuration of an impedance stabilization device 50 in Embodiment 1.

FIG. 5 illustrates an example of a configuration of a circuit of an impedance stabilization device 50 in which the value of $R_{S2}$ is set to "0".

As illustrated in FIG. 5, the impedance stabilization device 50 includes the series matching impedance elements 11a and 11b, the parallel matching impedance element 13, the low-frequency blocking element 14 and the high-frequency blocking elements 15a and 15b. The impedance stabilization device 50 illustrated in FIG. 5 has a configuration in which the series matching impedance elements 12a and 12b are eliminated from the impedance stabilization device 1.

The impedance stabilization device 50 ensures the path of a high-frequency signal (the path running through the series matching impedance elements 11a and 11b) and the path of a power current (the path running through the high-frequency blocking elements 15a and 15b), and unifies output terminals at the socket. The impedance stabilization device 50 achieves a configuration to reduce the impedance mismatch by connecting the parallel matching impedance element 13 to each of the lines 10a and 10b.

The impedance stabilization devices 50 and 1 have similar configurations in that (i) the high-frequency blocking elements 15a and 15b are configured to have sufficiently lower impedance than the impedance of the series matching impedance elements 11a and 11b to one of a low-frequency alternating current (e.g. 50 Hz and 60 Hz) and a direct current, and to have sufficiently higher impedance than the impedance of the series matching impedance elements 11a and 11b to a high-frequency signal, and (ii) the low-frequency blocking element 14 is configured to have sufficiently higher impedance than the impedance of the parallel matching impedance element 13 to one of a low-frequency alternating current (e.g. 50 Hz and 60 Hz) and a direct current, and to have sufficiently lower impedance than the impedance of the series matching impedance elements 11a and 11b to a high-frequency signal. It is then necessary to determine the impedance value so that the impedance stabilization device 50 shown in FIG. 5 can reduce the impedance mismatch and decrease the signal loss.

FIG. 6 shows the impedance value of each of the series matching impedance elements 11a and 11b and the parallel matching impedance element 13, together with the value of $VSWR_{MAX}$ and the signal loss associated with the impedance value. As previously described, it is preferable that the value of $VSWR_{MAX}$ be close to "1", and the signal loss be small.

Considering the fact that the value of $VSWR_{MAX}$ is preferably equal to or lower than "3" and the signal loss is equal to or lower than 10 dB in the impedance stabilization device 50, similarly to the impedance stabilization device 1, the requirements that the impedance value of each matching impedance element included in the impedance stabilization device 50 should meet are as follows:

Total impedance of the series matching impedance elements is 0.3 to 0.9 times higher than the characteristic impedance of the line; and Impedance of the parallel matching impedance element is 0.3 to 3 times higher than the characteristic impedance of the line.

As a result, in view of the requirements that each impedance value should meet in the impedance stabilization devices 1 and 50, it is desirable that the impedance values of the series matching impedance element and the parallel matching impedance element meet the following requirements:

Total impedance of the series matching impedance elements is 0.3 to 1.2 times higher than the characteristic impedance of the line; and Impedance of the parallel matching impedance element is 0.3 to 3 times higher than the characteristic impedance of the line.

These are the two requirements that each impedance value should meet.

Summary of Embodiment 1

As illustrated in FIGS. 1 and 5, the impedance stabilization device in Embodiment 1 has the following configuration. The first circuit including the series matching impedance elements (11a and 12a (11b and 12b)) and the high-frequency blocking element (15a (15b)) connected in parallel is inserted into the line (10a (10b)) constituting the power line. The two lines (10a and 10b) constituting the power line are connected via the second circuit including the parallel matching impedance element (13) and the low-frequency blocking element (14) connected in series. It is also possible to say that the second circuit, which includes the parallel matching impedance element (13) and the low-frequency blocking element (14) connected in series, is connected so as to be in parallel with equipment connected to the socket on the line in the power distribution system.

In this case, the high-frequency blocking element (15a (15b)) is configured to have sufficiently lower impedance than the impedance of the series matching impedance elements (11a, 11b, 12a and 12b) to one of a low-frequency alternating current (e.g. 50 Hz and 60 Hz) and a direct current, and to have sufficiently higher impedance than the impedance of the series matching impedance elements (11a, 11b, 12a and 12b) to a high-frequency signal. Also, the low-frequency blocking element (14) is configured to have sufficiently higher impedance than the impedance of the series matching impedance elements (11a, 11b, 12a and 12b) to one of a low-frequency alternating current (e.g. 50 Hz and 60 Hz) and a direct current, and to have sufficiently lower impedance than the impedance of the parallel matching impedance element (13) to a high-frequency signal.

With such a configuration, the path of a high-frequency signal and the path of a power current are provided, and the power current and the high-frequency signal are surely transmitted to the equipment side connecting to the socket.

Also, the total impedance of the series matching impedance elements (11a, 11b, 12a and 12b) is 0.3 to 1.2 times higher than the characteristic impedance of the line, and the impedance of the parallel matching impedance element (13) is 0.3 to 3 times higher than the characteristic impedance of the line. With such a configuration, the impedance mismatch is reduced as much as possible at a point where the impedance stabilization device is provided to the power distribution system. Therefore, since the reflection of high-frequency signals is suppressed, degradation of the communication performance is suppressed.

Modification of Embodiment 1

The following describes other configurations than those described in Embodiment 1 (see FIGS. 1 and 5) that the impedance stabilization device can have. Note that, for each impedance stabilization device, differences from the impedance stabilization device 1 are mainly described here.

Figure 7:
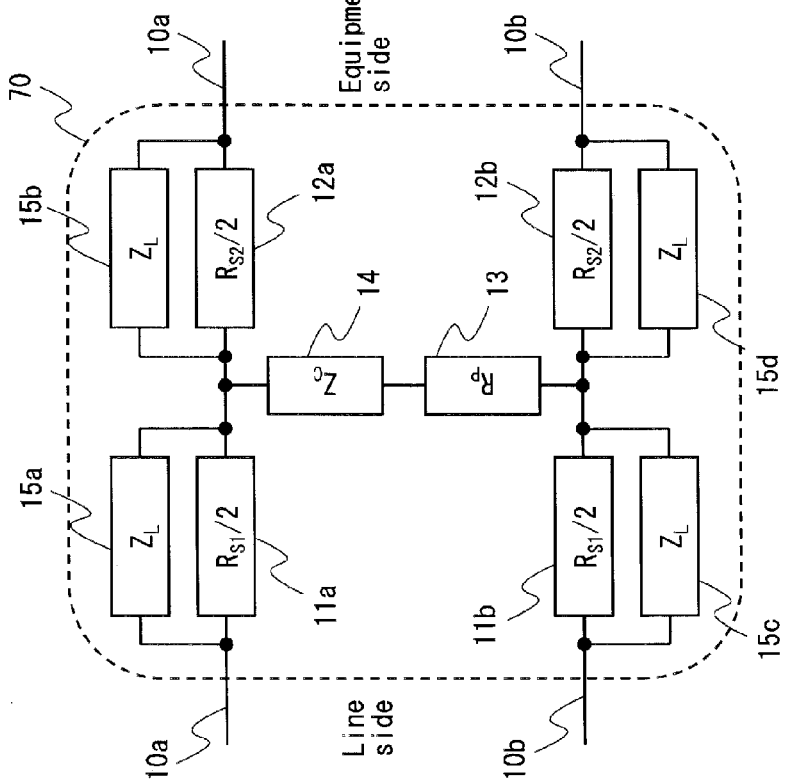
FIG. 7A illustrates a configuration of an impedance stabilization device 70 in a modification of Embodiment 1.
FIG. 7B illustrates a configuration of an impedance stabilization device 71 in another modification of Embodiment 1.
Figure 8:
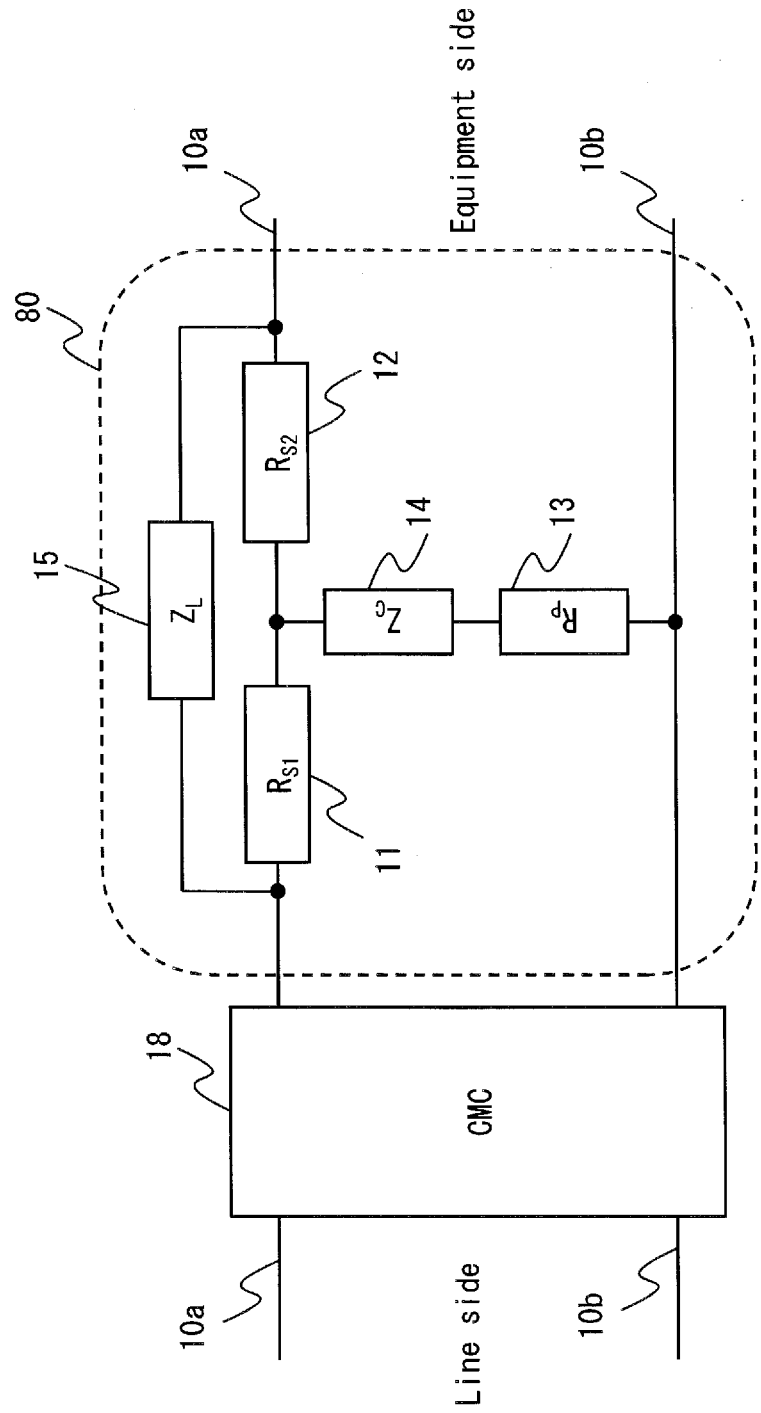
FIG. 8 illustrates a configuration of an impedance stabilization device 80 in yet another modification of Embodiment 1.

FIGS. 7A, 7B and 8 each illustrate examples of a configuration that the impedance stabilization device can have.

First, description is made on an impedance stabilization device 70 illustrated in FIG. 7A.

The impedance stabilization device 70 includes the series matching impedance elements 11a, 11b, 12a and 12b, the parallel matching impedance element 13, the low-frequency blocking element 14, and the high-frequency blocking elements 15a, 15b, 15c and 15d, as illustrated in FIG. 7A.

The impedance stabilization device 70 differs from the impedance stabilization device 1 in that each series matching impedance element is connected in parallel with a corresponding one of the high-frequency blocking elements 15a, 15b, 15c and 15d.

In a case of the impedance stabilization device 70 illustrated in FIG. 7A, the number of elements simply increases compared with the impedance stabilization device 1. However, by using a device in which the high-frequency blocking element is integrated with the series matching impedance element, the number of elements is reduced compared with the impedance stabilization device 1 illustrated in FIG. 1.

Note that, as an impedance stabilization device 71 illustrated in FIG. 7B, the impedance stabilization device 70 may have a configuration in which each matching impedance element is connected in parallel with a corresponding one of the low-frequency blocking elements and the high-frequency blocking elements. The impedance stabilization device 71 having such a configuration provides a similar effect to that provided by the impedance stabilization device 70. Furthermore, a low-frequency current flowing through each series matching impedance element is further suppressed by inserting a low-frequency blocking element such as a condenser in series into one or more of the series matching impedance elements 11a and 11b on the line side and the series matching impedance elements 12a and 12b on the equipment side, although illustration of such a configuration is omitted. Similarly to the circuit illustrated in FIG. 7B, the circuit illustrated in FIG. 5 may have a configuration in which a circuit including the series matching impedance elements and the parallel matching impedance elements is connected in parallel with a circuit including the low-frequency blocking elements and the high-frequency blocking elements. The circuit having such a configuration also provides a similar effect to that provided by the circuit illustrated in FIG. 5.

The impedance stabilization device may be configured as illustrated in FIG. 8. An impedance stabilization device 80 illustrated in FIG. 8 includes the series matching impedance elements 11a and 12a, the parallel matching impedance element 13, the low-frequency blocking element 14 and the high-frequency blocking element 15.

The impedance stabilization device 80 differs from the impedance stabilization device 1 illustrated in FIG. 1 in that the circuit including the series matching impedance elements 11b and 12b, and the high-frequency blocking element 15b connected in parallel is not inserted in series with the line 10b constituting the power line.

Even when the impedance stabilization device has such a configuration, the impedance stabilization device is configured so that the power current and the high-frequency signal are output from the same terminal, and the reflection of high-frequency signals are suppressed as long as the requirements described in Embodiment 1 are met.

With such a configuration, the number of elements included in the impedance stabilization device 80 is reduced compared with the impedance stabilization device 1. However, since the impedance stabilization device 80 has a configuration in which the series matching impedance elements are connected to only one of the lines 10a and 10b, a problem of reduction in balance level can occur.

In order to solve the above-mentioned problem, a CMC (Common Mode Choke) 18 may be provided on the power distribution system (or inside the impedance stabilization device 80) as illustrated in FIG. 8. The CMC 18 has a function of blocking in-phase currents flowing through the power line on the line side, and thus largely suppresses the leakage of radio waves. Note that the number of elements is further reduced by setting the value of $R_{S1}$ or $R_{S2}$ to "0" in this configuration.

<Usage of Impedance Stabilization Device>

Figure 9:
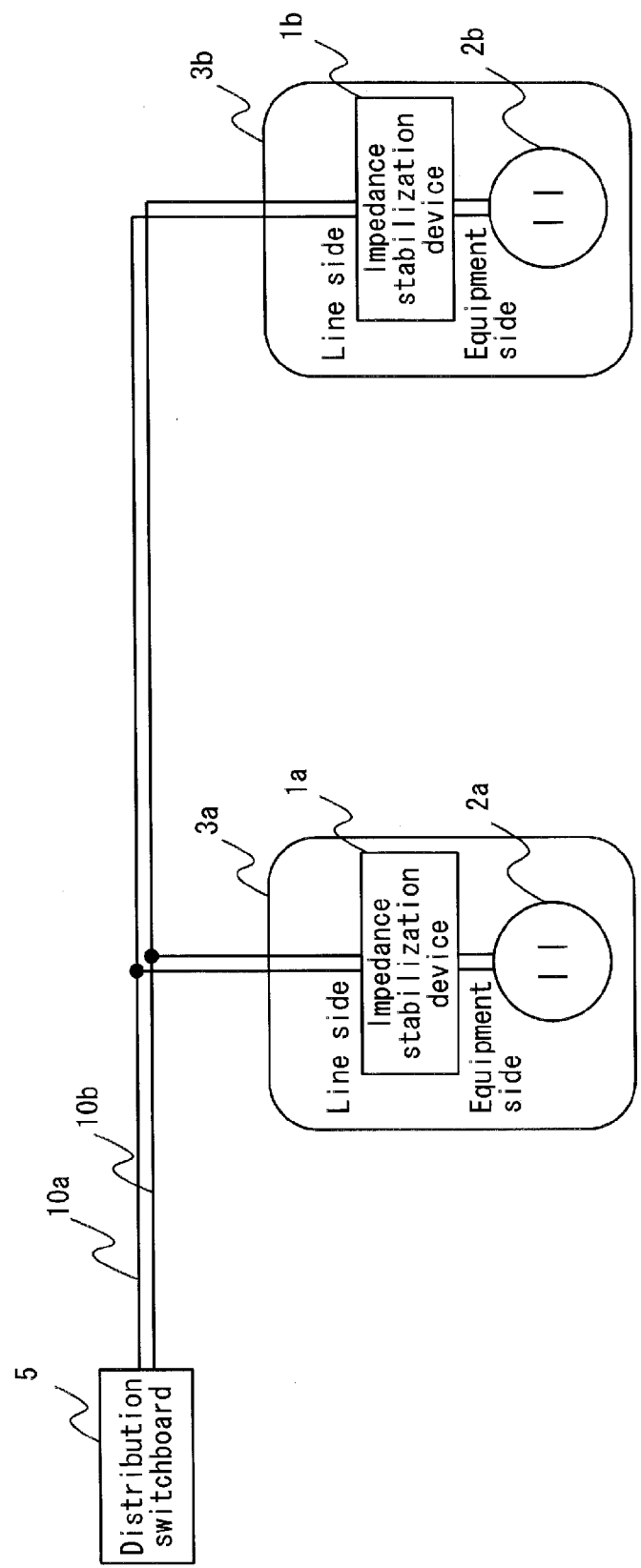
FIG. 9 illustrates a configuration of a power distribution system showing a usage of the impedance stabilization device.

Here, a usage of the impedance stabilization devices in Embodiment 1 and modifications of Embodiment 1 is shown in FIG. 9. FIG. 9 illustrates an example of a configuration of a power distribution system using the impedance stabilization device.

As illustrated in FIG. 9, the power distribution system has a configuration in which the power current is supplied from a distribution switchboard 5 to a socket connector 2a of a socket device 3a and a socket connector 2b of a socket device 3b through a line 4. An impedance stabilization device 1a is at a position closer to the line than the socket connector 2a is. An impedance stabilization device 1b is at a position closer to the line than the socket connector 2b is. Each of the impedance stabilization devices 1a and 1b illustrated in FIG. 9 has a configuration illustrated in one of FIGS. 1, 5, 7A, 7B and 8.

As illustrated in FIG. 9, the impedance stabilization devices are in one-to-one correspondence with sockets in the power distribution system. With such a configuration, although a terminal for outputting the power current and a terminal for outputting the high-frequency signal is the same in each socket, each socket receives both of the power current and the high-frequency signal, and the power distribution system reduces the impedance mismatch occurring at the socket.

Note that the number of socket devices each including socket connectors and the number of impedance stabilization devices being in one-to-one correspondence with the socket devices are not limited to those illustrated in FIG. 9. The impedance stabilization device is sometimes referred to as a "termination device" as it is positioned at a terminal of the power distribution system as illustrated in FIG. 9.

Embodiment 2

In Embodiment 1 described above, the impedance stabilization device is configured assuming that the impedance stabilization device is at the terminal of the power distribution system. The impedance stabilization device in Embodiment 1, however, can cause a problem in a case where a socket to which the impedance stabilization device is to be connected is in the midst of the power line, namely, in a case where the impedance stabilization device is not at the terminal.

Figure 10:
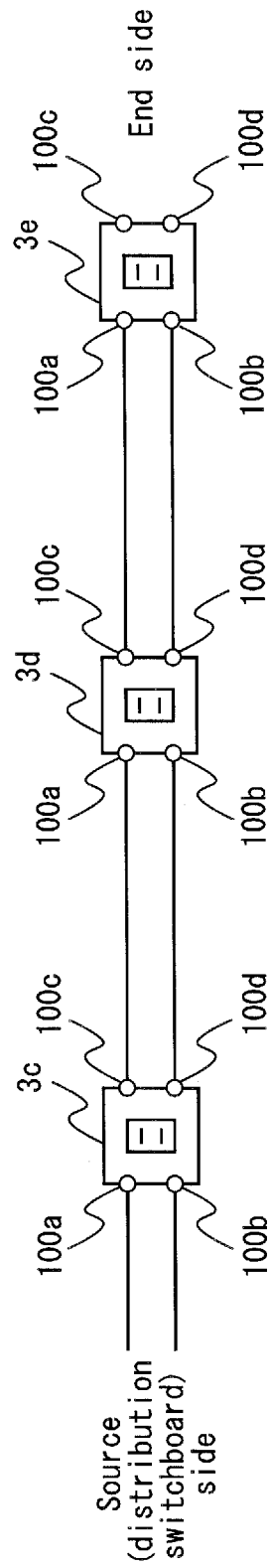
FIG. 10 illustrates an example of a power distribution system having a daisy-chain configuration.

Specifically, the impedance stabilization device in Embodiment 1 is unsuitable for a case where socket devices are connected with one another via a line in a daisy chain as illustrated in FIG. 10.

The reason therefor is as follows. Suppose that the impedance stabilization device in Embodiment 1 is connected to each socket (3c, 3d and 3e) in the power distribution system having a configuration illustrated in FIG. 10. In this case, if any equipment is connected to the socket 3e for example, the equipment is in parallel with wiring. Therefore, the impedance mismatch occurs at the socket 3c or the socket 3d. As described above, the impedance mismatch can cause the reflection of high-frequency signals and degrade the communication performance As a solution to the above problem, Embodiment 2 discloses an impedance stabilization device that uses only the socket as a terminal for outputting the power current and the high-frequency signal described in Embodiment 1, and that reduces the impedance mismatch even when being used in the system having a daisy-chain configuration as illustrated in FIG. 10.

Figure 11:
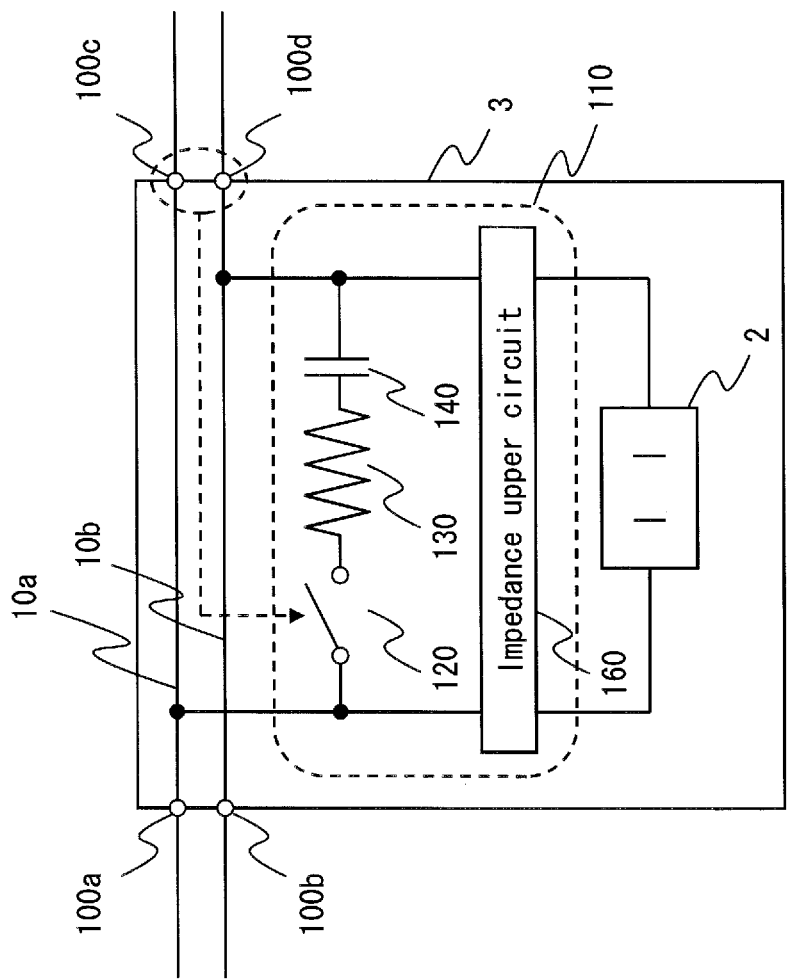
FIG. 11 is a circuit diagram illustrating an example of a specific configuration of an impedance stabilization device 110.

FIG. 11 illustrates an example of a configuration of a wiring device including the impedance stabilization device in the power distribution system in Embodiment 2. The wiring device corresponds to each of the sockets 3c, 3d and 3e in the power distribution system illustrated in FIG. 10.

As illustrated in FIG. 11, a socket device 3 as the wiring device includes source connectors 100a and 100b, feed connectors 100c and 100d, and a socket connector (also referred to as an "equipment connector") 2. The source connectors 100a and 100b connect two wiring lines 10a and 10b extending from a distribution switchboard. The feed connectors 100c and 100d connect the two lines extending to another socket device at an opposite side of the distribution switchboard. The socket connector 2 is connected to equipment and supplies power to the equipment. The socket device 3 also includes an impedance stabilization device 110.

As each of the source connectors 100a and 100b and the feed connectors 100c and 100d, a quick connector, which achieves electrical connection by sandwiching electric wire inserted as a wiring line, is preferably used.

The source connector 100a is connected to the feed connector 100c by the line 10a. The source connector 100b is connected to the feed connector 100d by the line 10b. Note that, in order to indicate that the lines 10a and 10b illustrated in FIG. 11 are respectively the same as the lines 10a and 10b illustrated in FIG. 10, the same reference signs are assigned.

Also, as illustrated in FIG. 11, the line 10a extends to one terminal of the socket connector 2, and the line 10b extends to the other terminal of the socket connector 2.

The impedance stabilization device 110 is inserted between the terminal and the lines 10a and 10b.

As illustrated in FIG. 11, the impedance stabilization device 110 includes a switch 120, a matching impedance element 130, a low-frequency blocking element 140 and an impedance upper circuit 160.

As illustrated in FIG. 11, a circuit including the switch 120, the matching impedance element 130 and the low-frequency blocking element 140 connected in series is connected in parallel with the impedance upper circuit 160 to form another circuit. The other circuit is connected to the line 10a at one end thereof, and is connected to the line 10b at the other end thereof.

As the matching impedance element 130, a resistance element having resistance approximately equal to the characteristic impedance of wiring (lines 10a and 10b) is typically used.

Typically used as the low-frequency blocking element 140 is a capacitor having low impedance to the high-frequency signal for use in the power line communication, and having sufficiently high impedance to a power current such as an alternating current of low-frequency (e.g. 50 Hz and 60 Hz) and a direct current.

The matching impedance element 130 corresponds to the parallel matching impedance element 13 in Embodiment 1. The low-frequency blocking element 140 corresponds to the low-frequency blocking element 14 in Embodiment 1. The impedance upper circuit 160 performs functions of the series matching impedance elements 11 and 12 in Embodiment 1.

Figure 12:
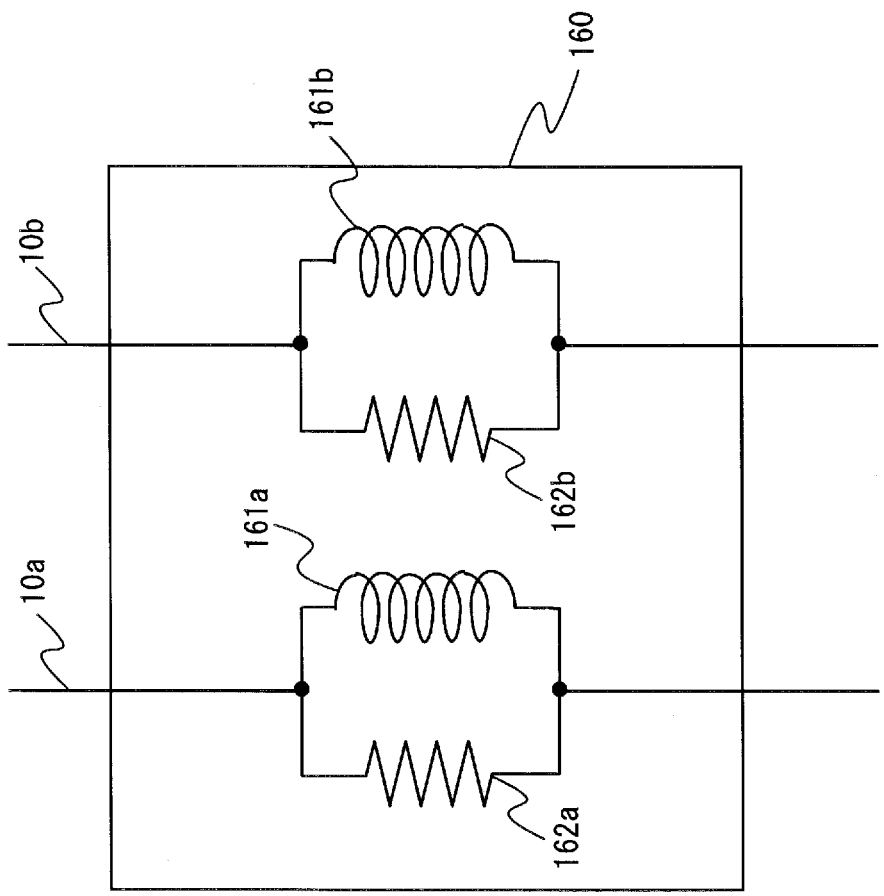
FIG. 12 is a circuit diagram illustrating an example of a specific configuration of an impedance upper circuit 160.

The impedance upper circuit 160 is typically realized by a choke coil. FIG. 12 illustrates an example of a configuration of the impedance upper circuit 160.

As illustrated in FIG. 12, the impedance upper circuit 160 includes choke coils 161a and 161b, and resistance elements 162a and 162b. As illustrated in FIG. 12, the impedance upper circuit 160 has a configuration in which a circuit including the choke coil 161a and the resistance element 162a connected in parallel is connected in series with the line 10a, and another circuit including the choke coil 161b and the resistance element 162b connected in parallel is connected in series with the line 10b. By setting the impedance of the resistance elements 162a and 162b so as to be several times higher than the approximate characteristic impedance of the lines 10a and 10b, the effect of equipment having a low impedance is reduced when the equipment is connected to the socket connector 2, and power line communication is enabled by passing the high-frequency signal to same extent even when the power line communication equipment is connected to the socket connector 2. Each of the choke coils 161a and 161b corresponds to the high-frequency blocking element in Embodiment 1. Each of the resistance elements 162a and 162b corresponds to the series matching impedance element in Embodiment 1.

Referring back to FIG. 11, the switch 120 included in the impedance stabilization device 110 opens while wiring (the lines 10a and 10b) is connected to the feed connectors 100c and 100d, and closes while no wiring is connected to the feed connectors 100c and 100d.

The switch 120 detects a voltage value at each of the feed connectors 100c and 100d. According to a change in voltage value, the switch 120 detects whether wiring is connected to the feed connectors 100c and 100d. The switch 120 performs the detection by storing in advance a range of the voltage values in a case where wiring is connected to the feed connectors 100c and 100d, and determining whether or not the detected voltage value is within the stored range. The switch 120 opens or closes according to results of the detection.

In a case where wiring is connected to the feed connectors 100c and 100d, the socket device is not the end of the power distribution system. The switch 120 opens as it is unnecessary to cause the matching impedance element 130 to function as a termination resistor. In a case where no wiring is connected to the feed connectors 100c and 100d, the socket device has to be the end of the power distribution system. The switch 120 closes as it is necessary to cause the matching impedance element 130 to function as the termination resistor.

With such a configuration, it is possible to provide the impedance stabilization device that uses the same socket connector 2 as a terminal for outputting a power current and a terminal for outputting a high-frequency signal, reduces the impedance mismatch regardless of whether or not the socket device is the end of the power distribution system, and is applicable to the power distribution system having the daisy-chain configuration.

Summary of Embodiment 2

When equipment is connected to the socket connector 2, the impedance upper circuit 160 included in the impedance stabilization device 110 reduces the effect of the impedance of the connected equipment on the wiring side. Therefore, the socket device 3e on the right side of FIG. 10 operates as the matched end, whereas the socket devices 3c and 3d other than the socket device 3e operate as part of the wiring to which no equipment is connected. With the above-mentioned configuration, the wiring illustrated in FIG. 10 achieves the power distribution system that does not cause intense reflection in each socket device, and that enables the powerline communication having favorable channel characteristics.

Modification of Embodiment 2

The following describes various modifications of the impedance stabilization device 110 in Embodiment 2. Note that differences from the impedance stabilization device 110 are mainly described here.

Modification 1 of Embodiment 2

Figure 13:
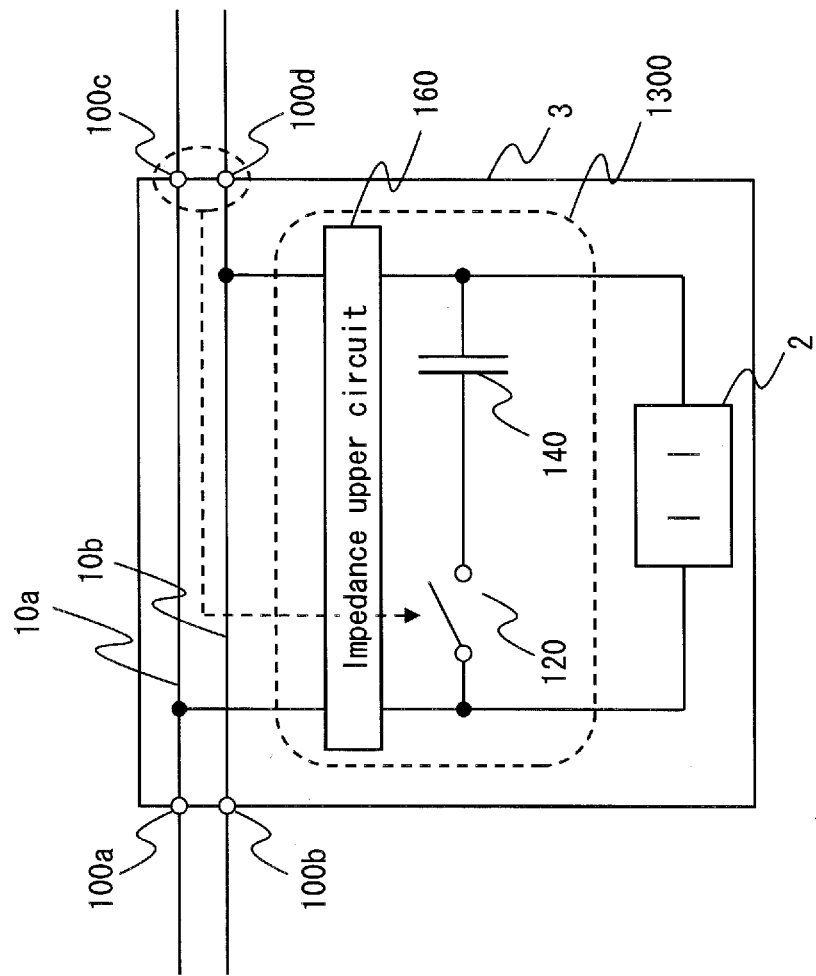
FIG. 13 is a circuit diagram illustrating an example of a specific configuration of an impedance stabilization device 1300.

An impedance stabilization device 1300 illustrated in FIG. 13 differs from the impedance stabilization device 110 illustrated in FIG. 11 in that the matching impedance element 130 is removed, and the impedance upper circuit 160 is inserted at a side closer to not the socket connector 2 but the line than the switch 120 is. The impedance upper circuit 160 has the same configuration as that illustrated in FIG. 12. The total impedance of the two resistance elements 162a and 162b included in the impedance upper circuit 160 is set so as to be approximately equal to the characteristic impedance of the wiring. Since the two resistance elements 162a and 162b double as the matching impedance element 130 included in the impedance stabilization device 110 illustrated in FIG. 11, the matching impedance element 130 is removed, and thus the circuit is simplified.

Modification 2 of Embodiment 2

Figure 14:
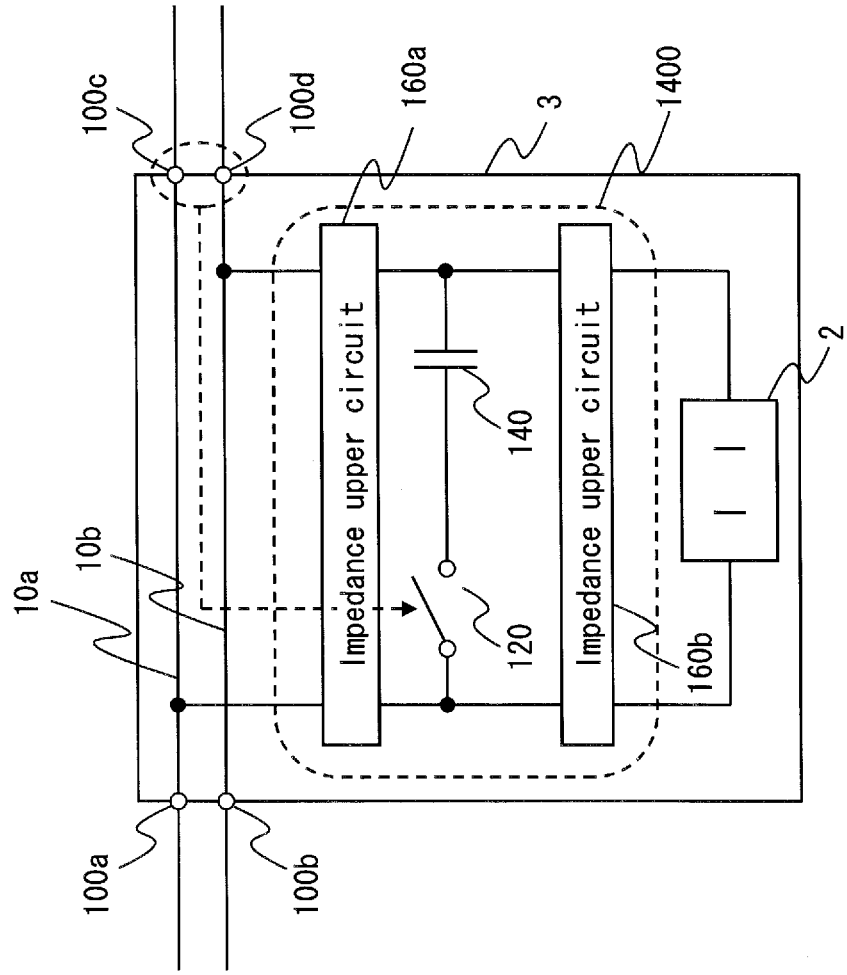
FIG. 14 is a circuit diagram illustrating an example of a specific configuration of an impedance stabilization device 1400.

An impedance stabilization device 1400 illustrated in FIG. 14 differs from the impedance stabilization device 110 illustrated in FIG. 11 in that an impedance upper circuit 160a is inserted at a side closer to the line than the switch 120 is, and an impedance upper circuit 160b is inserted at a side closer to the socket connector 2 than the switch 120 is.

The impedance upper circuit 160a included in the impedance stabilization device 1400 operates in a similar manner to the impedance upper circuit 160 included in the impedance stabilization device 1300 illustrated in FIG. 13. That is to say, the total impedance of the two resistance elements 162a and 162b included in the impedance upper circuit 160a is set so as to be approximately equal to the characteristic impedance of the wiring. The two resistance elements 162a and 162b double as the matching impedance element 130 illustrated in FIG. 11.

On the other hand, while the impedance upper circuit 160b also has the configuration as illustrated in FIG. 12, the impedance of the resistance elements 162a and 162b included in the impedance upper circuit 160b does not have to be the same as that of the resistance elements 162a and 162b included in the impedance upper circuit 160a. For example, in order to preferentially reduce the effect of equipment connected to the socket connector 2, resistance of the resistance element included in the impedance upper circuit 160b may be set so as to be higher than that of the resistance element included in the impedance upper circuit 160a. Alternatively, in order to reduce the loss of high-frequency signals when power line communication equipment is connected to the socket connector 2, resistance of the resistance element included in the impedance upper circuit 160b may be set so as to be lower than that of the resistance element included in the impedance upper circuit 160a.

As described above, the impedance stabilization device 1400 independently controls a degree of the impedance mismatch and a loss of the high-frequency signals, as the impedance upper circuit 160a controls the degree of the impedance mismatch and the impedance upper circuit 160b controls the loss of the high-frequency signals.

Modification 3 of Embodiment 2

Figure 15:
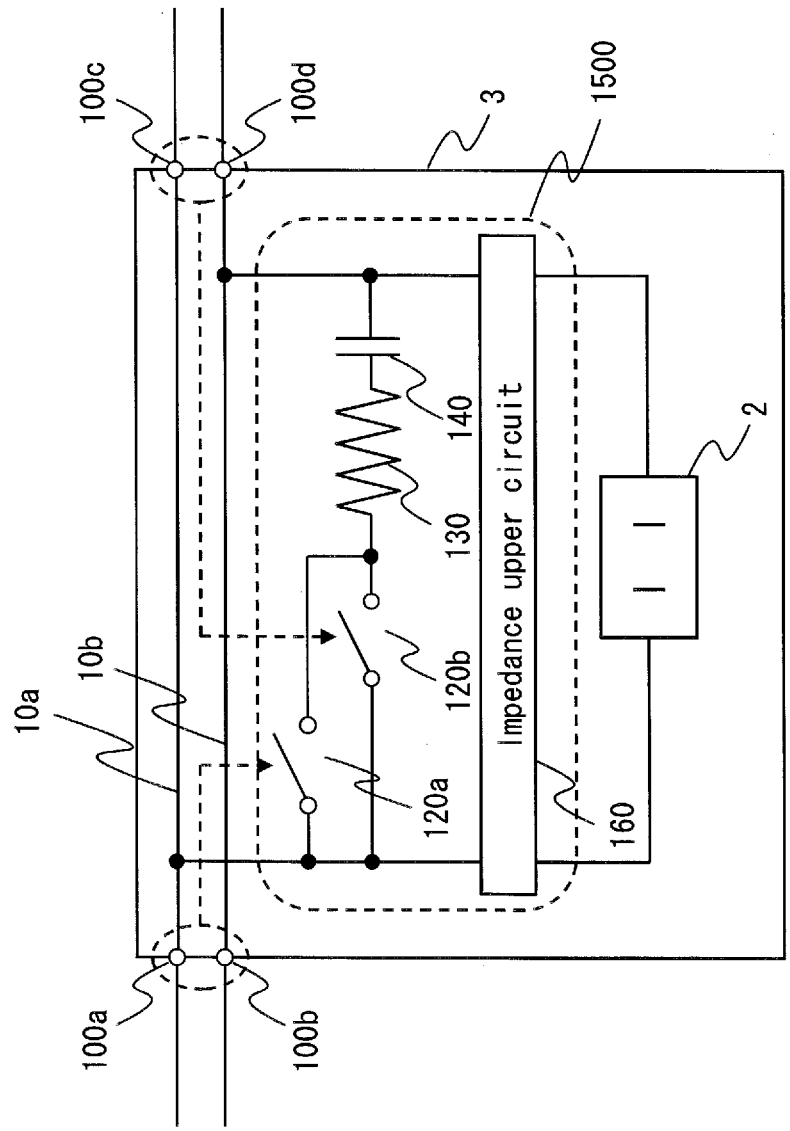
FIG. 15 is a circuit diagram illustrating an example of a specific configuration of an impedance stabilization device 1500.

An impedance stabilization device 1500 illustrated in FIG. 15 differs from the impedance stabilization device 110 illustrated in FIG. 11 in that a switch 120a is added. The switch 120b included in the impedance stabilization device 1500 is equivalent to the switch 120 of the impedance stabilization device 110.

The switch 120a is configured to open while wiring is connected to the source connectors 100a and 100b included in the socket device 3, and to close while no wiring is connected to the source connectors 100a and 100b. The switch 120a detects whether or not wiring is connected in a similar manner to the switch 120.

The switch 120b is configured to open while wiring is connected to the feed connectors 100c and 100d included in the socket device 3, and to close while no wiring is connected to the feed connectors 100c and 100d, similarly to the switch 120.

In the impedance stabilization device 1500, while no wiring is connected to at least one of the source connector and the feed connector, at least one of the switches 120a and 120b closes so that two lines 10a and 10b are connected via the second circuit including the matching impedance element 130 and the low-frequency blocking element 140 connected in series.

On the other hand, while wiring is connected to each of the source connector and the feed connector, each of the switches 120a and 120b opens. Since the switches 120a and 120b are connected in parallel, the matching impedance element 130 and the low-frequency blocking element 140 are not used.

With the configuration illustrated in FIG. 15, there is no need to distinguish the source connector and the feed connector. The socket device at the end operates as a matching terminal and the socket device that is not at the end operates as part of the wiring to which no equipment is connected, regardless of whether wiring is connected to the source connector or the feed connector. Therefore, although having a disadvantage that the number of circuits increases compared with the impedance stabilization device having the configuration illustrated in FIG. 11 as the switch is added, the impedance stabilization device 1500 has an advantage that it is installed in the power distribution system more easily compared with the impedance stabilization device having the configuration illustrated in FIG. 11.

Note that, although the switches 120a and 120b are separately provided in FIG. 15, the configuration of the switches 120a and 120b are not limited to this. A single switch may mechanically be connected to each of the source connector and the feed connector to achieve a similar function.

Embodiment 3

Embodiment 3 describes a case where the impedance stabilization device in Embodiment 1 is applied to the power distribution system having the daisy-chain configuration in Embodiment 2.

Figure 16:
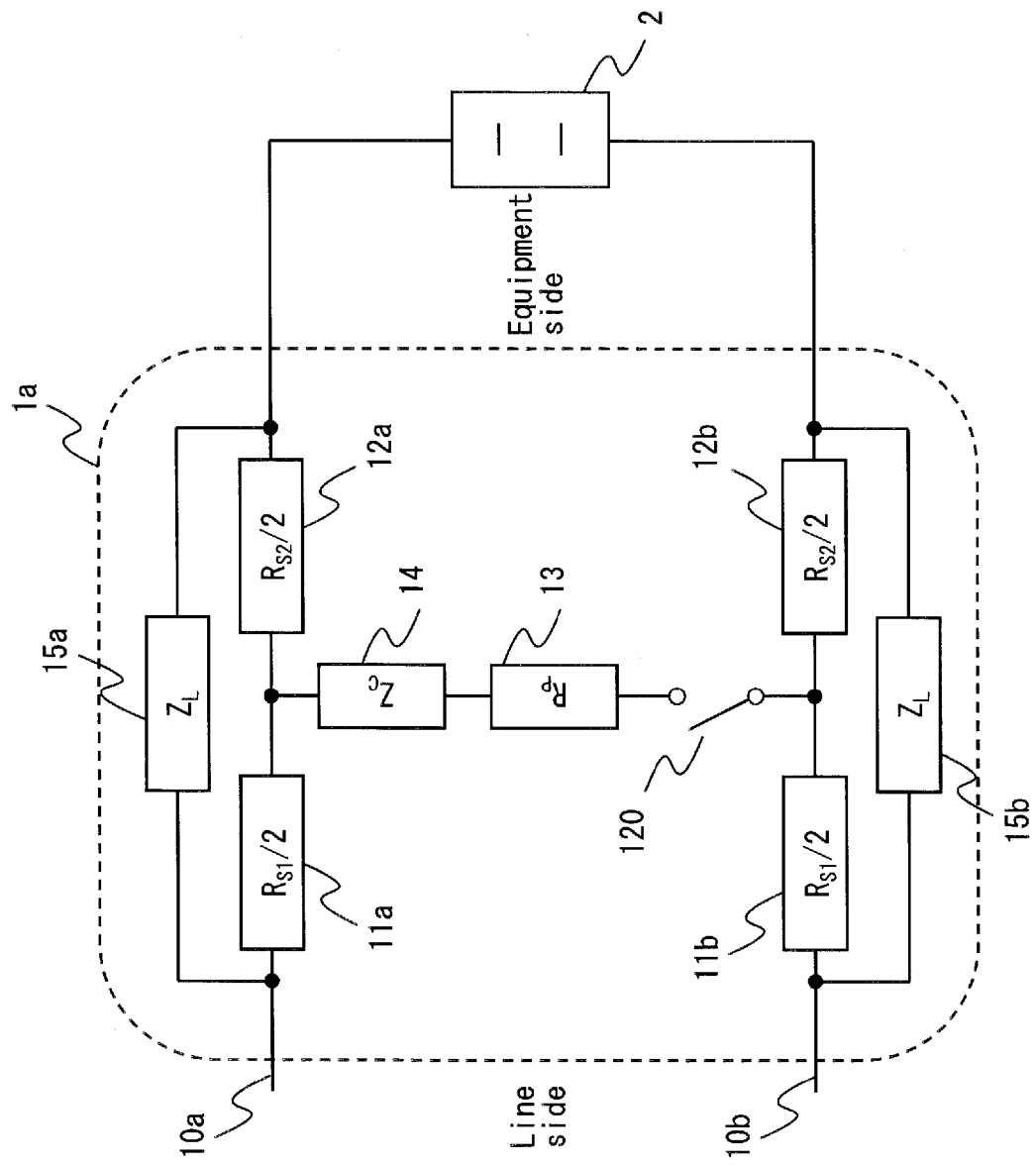

A configuration equivalent to that of the impedance stabilization device 110 or the like in Embodiment 2 is achieved as the configuration of the impedance stabilization device 1a illustrated in FIG. 16 in which the switch 120 is added to the impedance stabilization device 1.

Figure 17:
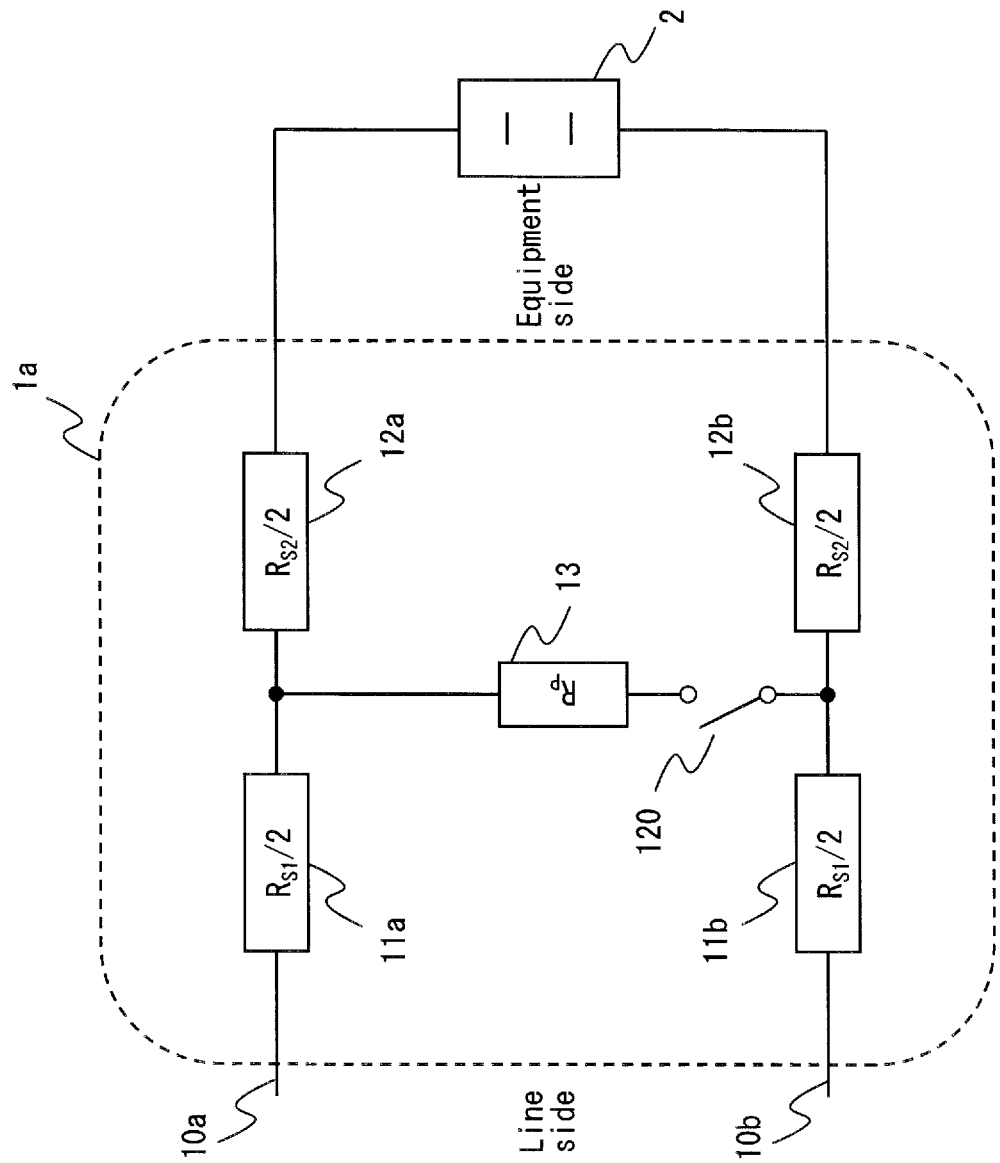
FIG. 17 is an equivalent circuit diagram of the impedance stabilization device 1a to the high-frequency signal.

As illustrated in FIG. 16, the switch 120 is connected in series with the second circuit including the parallel matching impedance element 13 and the low-frequency blocking element 14 connected in series. FIG. 17 illustrates a configuration of an equivalent circuit of the impedance stabilization device 1a illustrated in FIG. 16 to a high-frequency signal in a case where the switch 120 closes.

Figure 18:
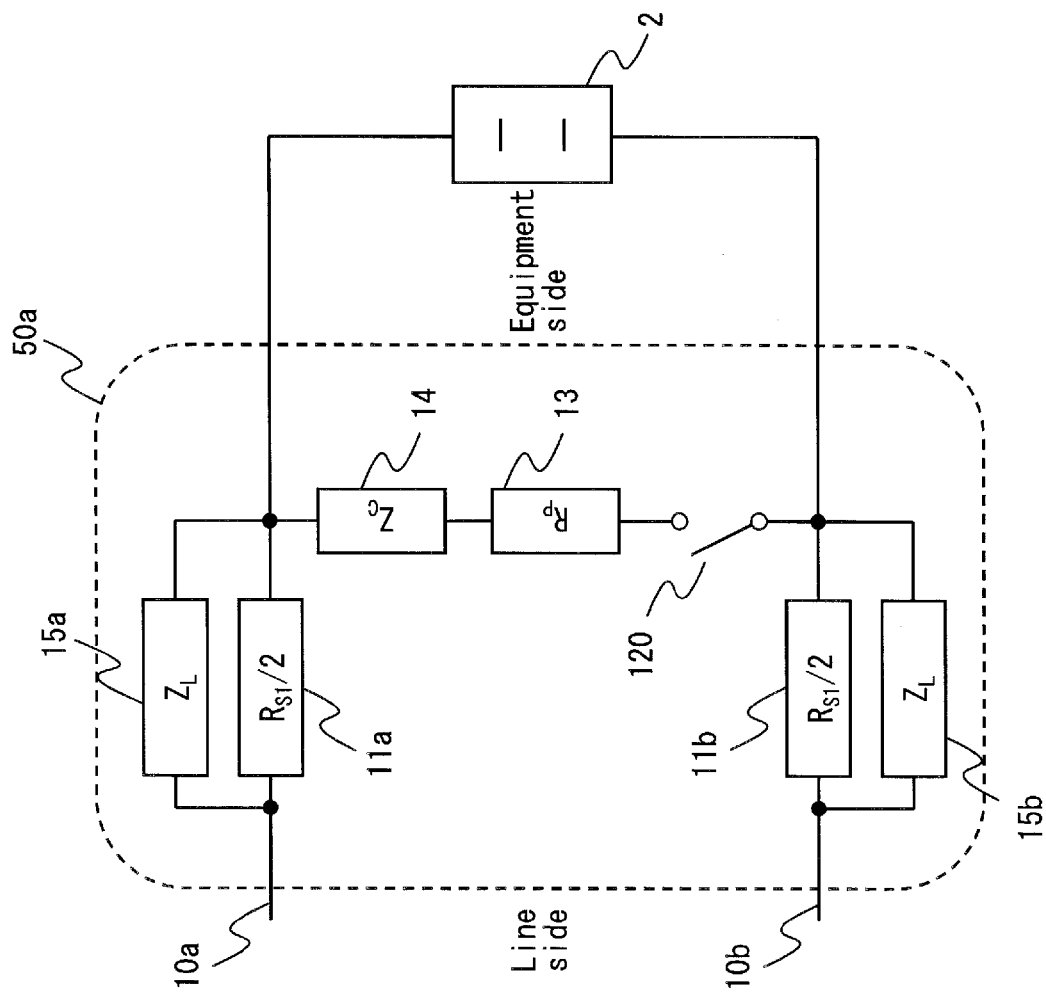
Figure 19:
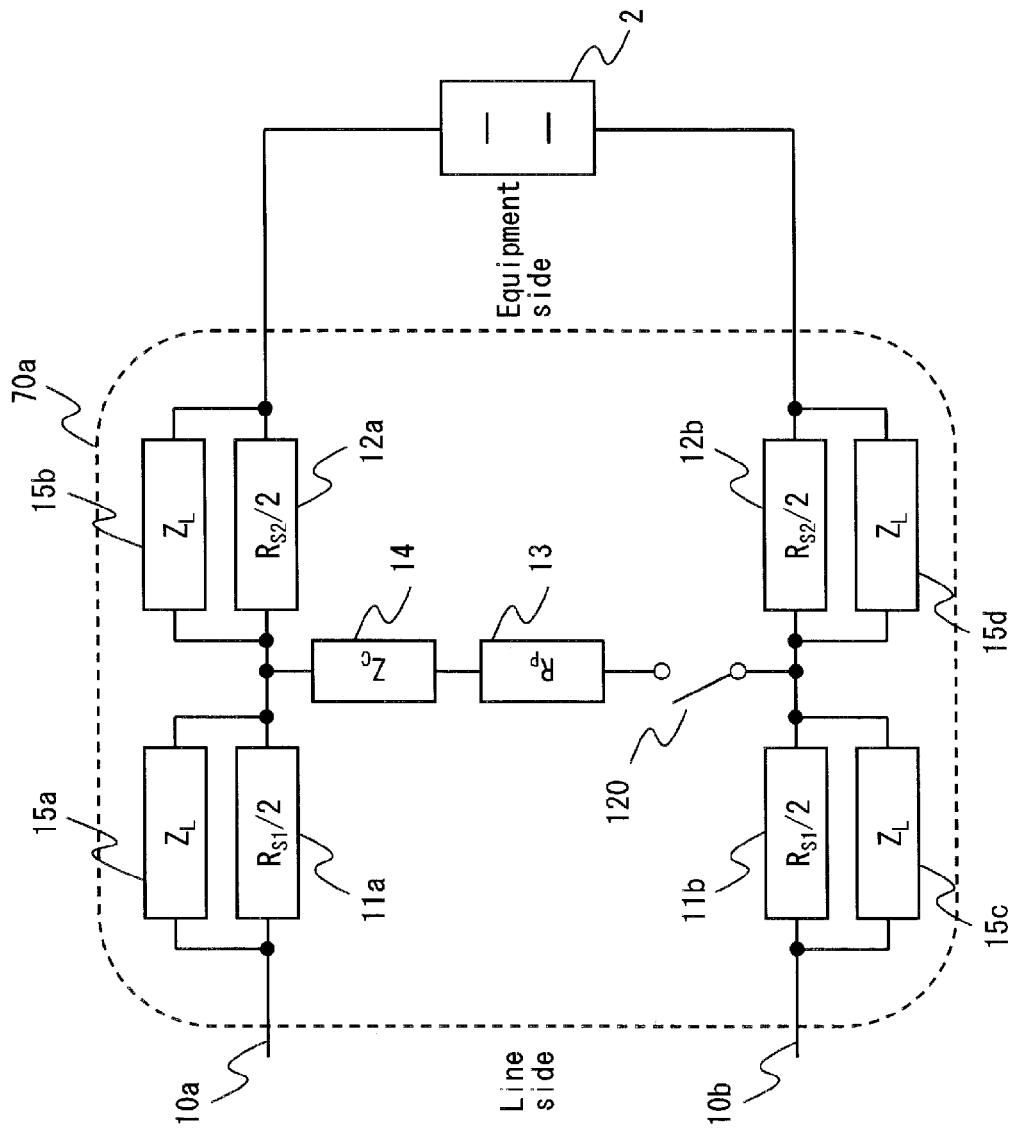

Similarly, by inserting the switch 120 into the impedance stabilization device 50 at a position as shown in FIG. 18, it is possible to provide an impedance stabilization device 50a having an equivalent configuration to the impedance stabilization device 110. Furthermore, by inserting the switch 120 into the impedance stabilization device 70 illustrated in FIG. 7A at a position as shown in FIG. 19, it is possible to provide an impedance stabilization device 70a having an equivalent configuration to the impedance stabilization device 110.

Note that, although not shown in FIGS. 16 to 19, each switch 120 opens and closes according to whether wiring is connected to the feed connectors 100c and 100d included in the socket device, similarly to the switch 120 in Embodiment 2.

Also, as described in Modification 3 of Embodiment 2, another switch 120 that opens and closes according to whether wiring is connected to the source connector may be connected in parallel with the switch 120 in each of the configurations illustrated in FIGS. 16 to 19.

Note that, in such a case, conditions that the series matching impedance element and parallel matching impedance element should meet are the same as those described in Embodiment 1.

Summary of Embodiment 3

As described above, by connecting the switch 120 in series with the second circuit, the impedance stabilization device in Embodiment 1 is applicable to the power distribution system having the daisy-chain configuration.

<Supplement>

Although the present invention has been described based on the above embodiments, it is obvious that the present invention is not limited to the above embodiments. The following describes further modifications of the above embodiments of the present invention that can be made without departing from the spirit of the present invention.

(1) In each of the above embodiments, the impedance stabilization device is provided to the socket. Power distribution equipment including the impedance stabilization device, however, is not limited to the socket device. The impedance stabilization device may be built into another type of power distribution equipment. For example, the impedance stabilization device may be built into a joint box used at a point where the wiring branches or connection equipment that fixes a lighting fixture to the ceiling. Alternatively, the impedance stabilization device may be built into a power strip used by being connected to an existing socket or may be used as an adapter inserted between the socket and the connection equipment.

(2) In Embodiment 2 described above, the switch 120 is configured to detect the voltage value of each of the feed connectors 100c and 100d. However, any method may be used to detect whether or not wiring is connected to the feed connectors 100c and 100d. For example, instead of detecting the voltage value using the switch 120, the impedance stabilization device may include a detection circuit for detecting the voltage value at each of the feed connectors 100c and 100d, and the switch 120 may open and close according to instructions from the detection circuit. Alternatively, another switch that switches on while wiring is connected to each of the feed connectors 100c and 100d may be provided, and the switch 120 may open upon being notified that the other switch switches on.

(3) Each of the above embodiments describes the impedance stabilization device that is used in the power distribution system composed of two lines. The impedance stabilization device, however, is not limited to that used in the power distribution system composed of two lines.

Figure 20:
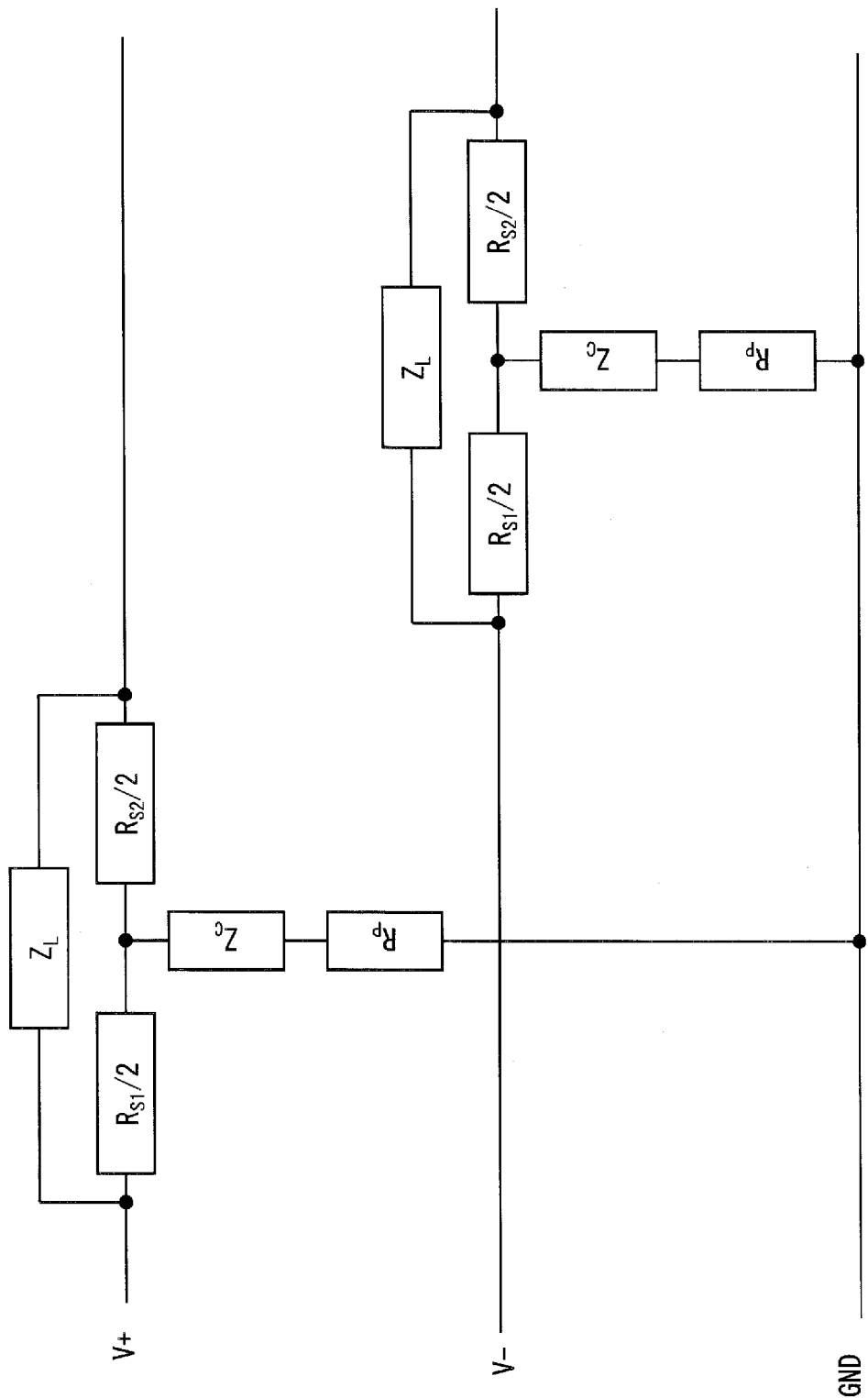
FIG. 20 illustrates an example of a configuration of an impedance stabilization device using a midpoint potential GND wire.
Figure 21:
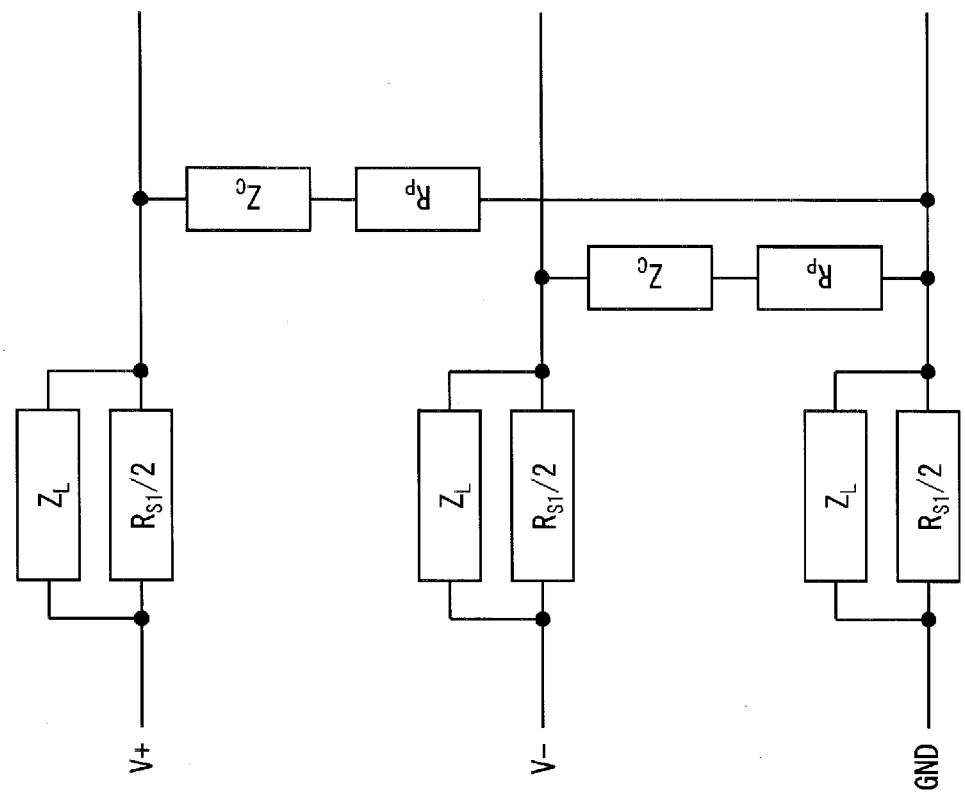
FIG. 21 illustrates an example of a configuration of an impedance stabilization device having a balance level higher than that of the impedance stabilization device illustrated in FIG. 20.
Figure 22:
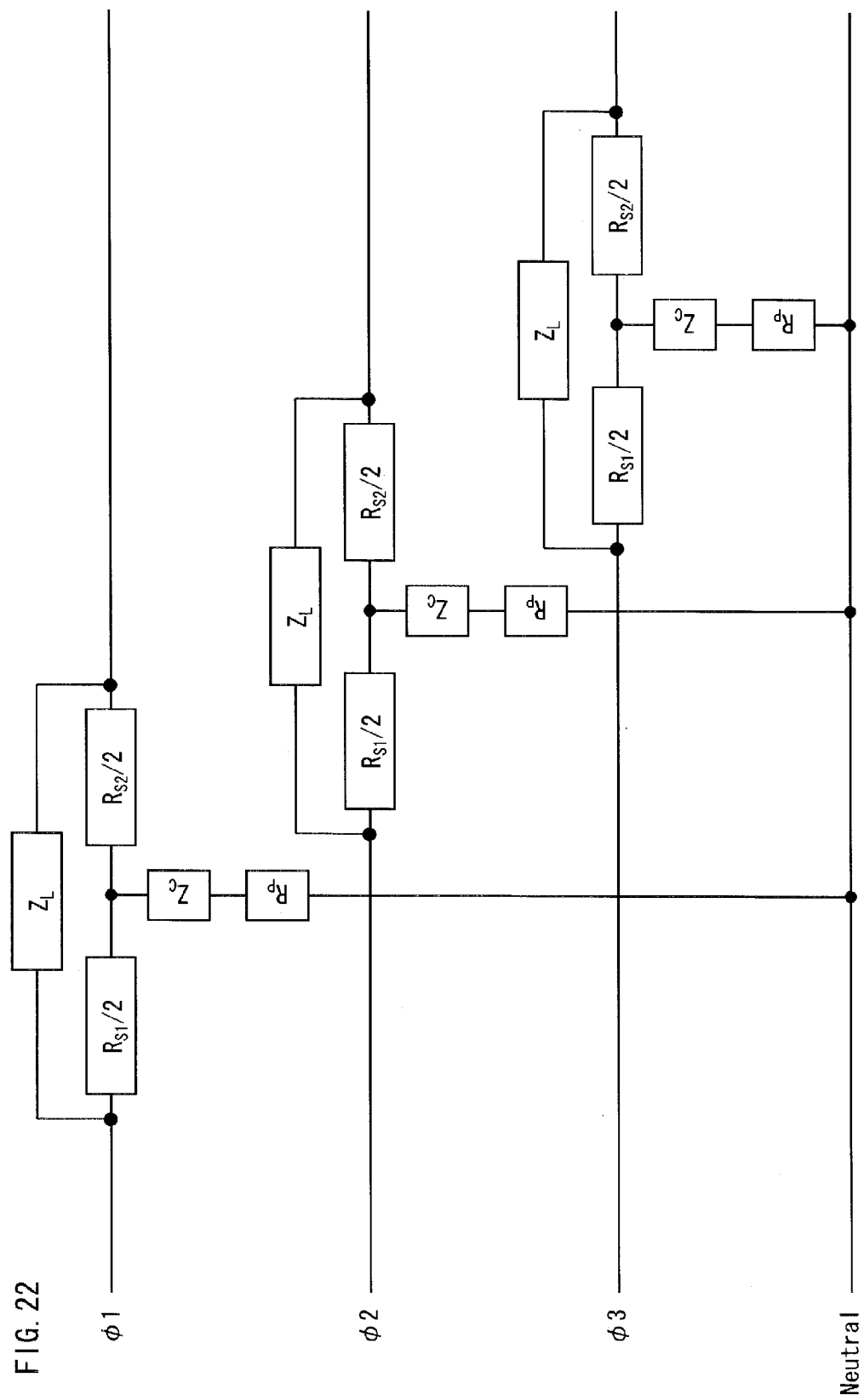
FIG. 22 illustrates an example of a configuration of an impedance stabilization device adapting to a three-phase alternating current.

As illustrated in FIGS. 20 to 22, the impedance stabilization device is applicable to a power distribution system composed of a plurality of lines.

FIGS. 20 and 21 each illustrate examples of a case where the impedance stabilization device is applied to a power distribution system composed of three lines, namely two power lines and one ground line. FIG. 21 illustrates an example of a configuration that is more balanced than that illustrated in FIG. 20.

With such a configuration, it is possible to provide an impedance stabilization device that is applicable to a high voltage power distribution system requiring the ground wire, a single-phase three-wire power distribution system supplying power to standard homes, or the like.

As illustrated in FIG. 22, the number of lines may further be increased.

The impedance stabilization device is also applicable to a three-phase alternating-current power distribution system as illustrated in FIG. 22.

Furthermore, a Neutral line illustrated in FIG. 22 may be a Common GND line that applies a different voltage to each line ($\phi 1$ to $\phi 3$). In such a case, the number of lines may further be increased according to the amount of voltage applied.

As described above, the impedance stabilization device is applicable to a power distribution system composed of three or more lines according to a type of power source.

(4) In each of the above embodiments, a passive element called the resistance element is used as the series matching impedance element included in the impedance stabilization device. Instead of the passive element, however, an active element may be used as long as the conditions described in Embodiment 1 are met.

Figure 23:
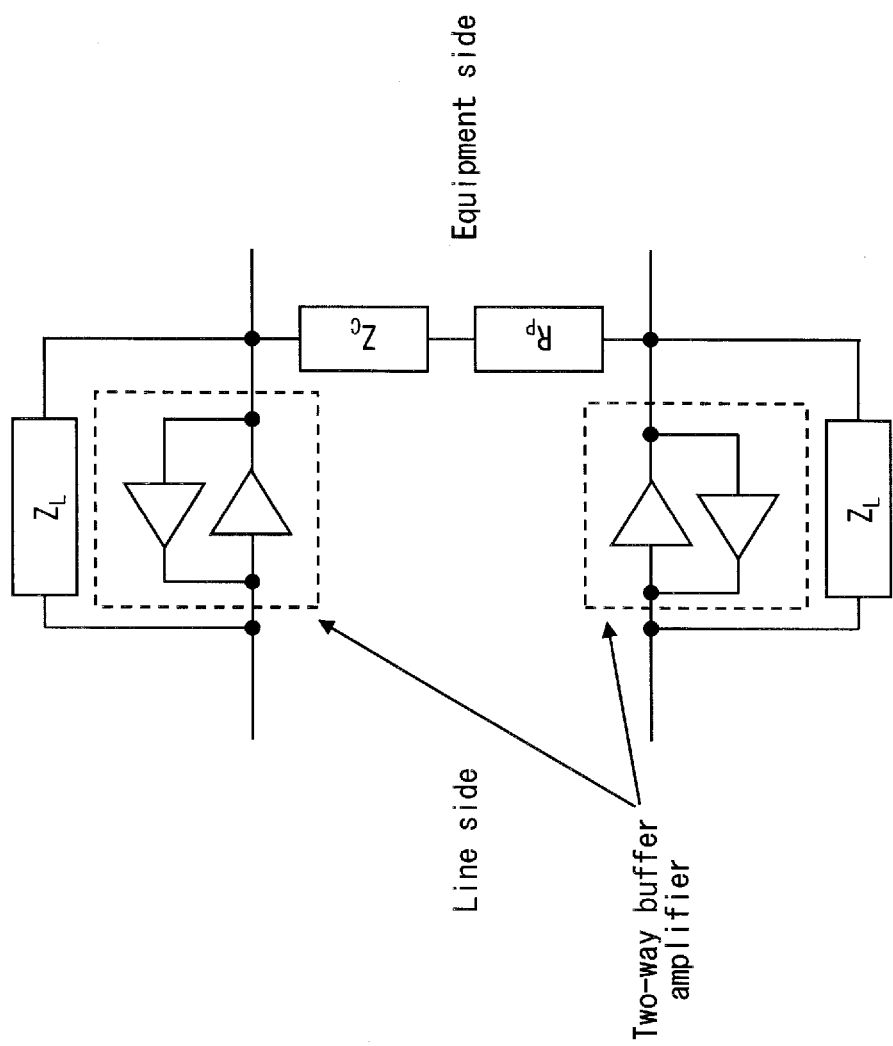
FIG. 23 illustrates an example of a configuration of an impedance stabilization device using an active element as a series matching impedance element.

FIG. 23 illustrates an example of an impedance stabilization device that uses the active element as the series matching impedance element.

A two-way buffer amplifier is used as the series matching impedance element included in the impedance stabilization device illustrated in FIG. 23. The two-way buffer amplifier switches between buffer amplifiers to be used according to a communication direction (communication from the wiring side to the equipment side or communication from the equipment side to the wiring side). The impedance stabilization device may be configured in the above-mentioned manner.

Note that, although the impedance stabilization device illustrated in FIG. 23 is a modification of the impedance stabilization device 50 illustrated in FIG. 5, the active element may also be used as the series matching impedance element illustrated in each of the embodiments.

Figure 24:
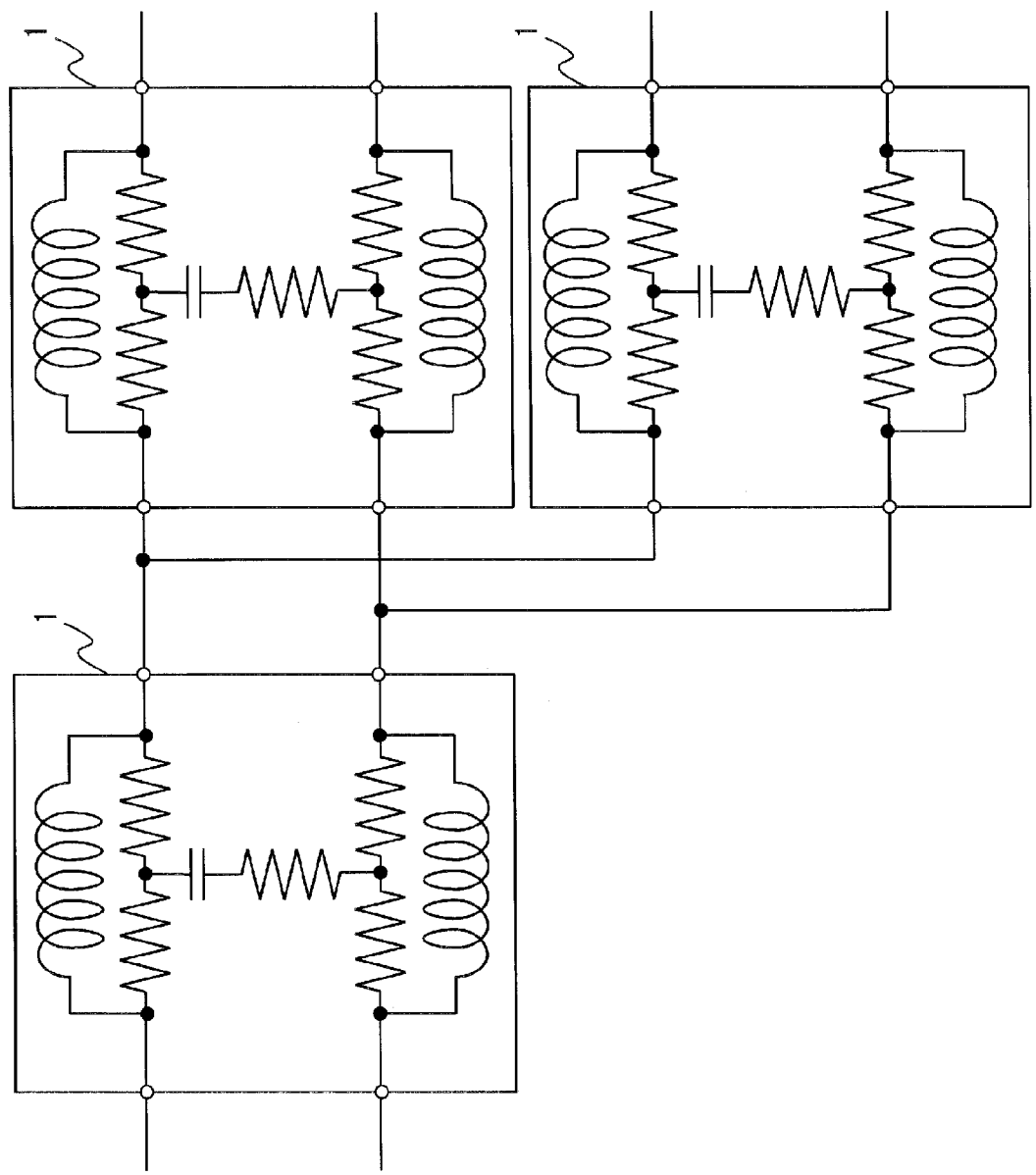
FIG. 24 illustrates an example of a configuration of a system using an impedance stabilization device as a distributor.
Figure 25:
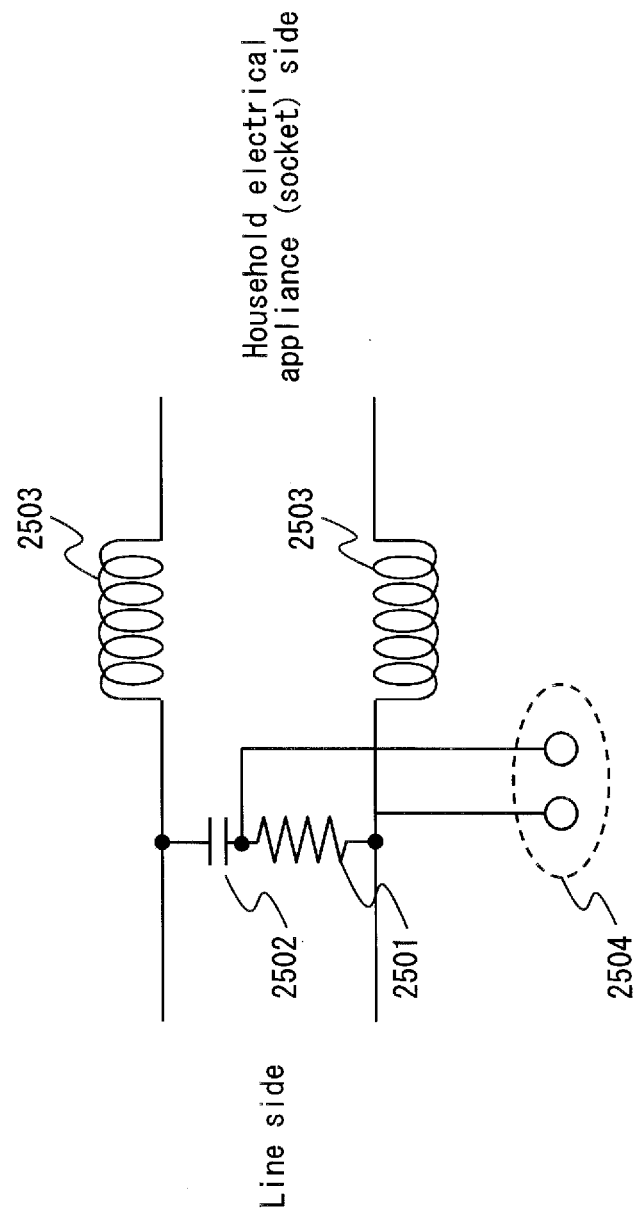
FIG. 25 is a circuit diagram of a conventional termination device.

(5) Instead of being used in the power distribution system, the impedance stabilization device in each of the above-mentioned embodiments may be connected to other impedance stabilization devices to achieve branch wiring illustrated in FIG. 24. Alternatively, integral branch equipment having a configuration illustrated in FIG. 24 may be provided. The number of branching lines is not limited to two as illustrated in FIG. 24, and may be more than two such as three or four.

(6) Each of the configurations described in Embodiments 1 to 3 and <Supplement> may be combined with one another as long as the combined configuration reduces the impedance mismatch and shares the signal input-output terminal

INDUSTRIAL APPLICABILITY

The impedance stabilization device pertaining to the present invention is configured such that each of the power line communication equipment and the household electrical appliance is detachably connected to the terminal such as a socket, and prevents the channel characteristic degradation in the power line communication. Therefore, the impedance stabilization device pertaining to the present invention is useful for a home network or the like using the power line communication.

[Reference Signs List]

| | |
|---|---|
| 1, 1a, 50, 50a, 70, 70a, 80, 110, 1300, 1400, 1500 | impedance stabilization device |
| 2, 2a, 2b | socket connector |
| 3, 3a, 3b, 3c, 3d, 3e | socket device (socket, power distribution equipment) |
| 5 | distribution switchboard |
| 10a, 10b | line |
| 11, 11a, 11b, 12, 12a, 12b | series matching impedance element (first impedance element) |
| 13 | parallel matching impedance element (second impedance element) |
| 14, 140 | low-frequency blocking element |
| 15, 15a, 15b, 15c, 15d | high-frequency blocking element |
| 18 | CMC (Common Mode Choke) |
| 100a, 100b | source connector |
| 100c, 100d | feed connector |
| 120, 120a, 120b | switch |
| 130 | matching impedance element |
| 160, 160a, 160b | impedance upper circuit |
| 161a, 161b | choke coil |
| 162a, 162b | resistance element |
| 2501 | termination resistor |
| 2502 | capacitor (condenser) |
| 2503 | inductor |
| 2504 | signal input-output terminal |

The invention claimed is:

1. An impedance stabilization device used for power line communication performed by superimposing a high-frequency signal on a power line composed of at least two lines, the impedance stabilization device comprising:
a first circuit that includes a first impedance element and a high-frequency blocking element connected in parallel, and is inserted into at least one of the lines; and
a second circuit that includes a second impedance element and a low-frequency blocking element connected in series, and via which the lines are connected, wherein
the high-frequency blocking element has higher impedance than impedance of the first impedance element to the high-frequency signal, and has lower impedance than impedance of the first impedance element to one of a low-frequency alternating current and a direct current supplied to the power line, and
the low-frequency blocking element has lower impedance than impedance of the second impedance element to the high-frequency signal, and has higher impedance than impedance of the second impedance element to one of the low-frequency alternating current and the direct current.

2. The impedance stabilization device of claim 1, wherein impedance of the first impedance element is 0.3 to 1.2 times higher than characteristic impedance of the lines.

3. The impedance stabilization device of claim 1, wherein impedance of the second impedance element is 0.6 to 3 times higher than characteristic impedance of the lines.

4. The impedance stabilization device of claim 1 being provided in power distribution equipment having a source connector and a feed connector, wherein
the second circuit further includes a switch connected in series with either the second impedance element or the low-frequency blocking element, and
the switch closes while no wiring is connected to the feed connector, and opens while wiring is connected to the feed connector.

5. The impedance stabilization device of claim 1 being provided in power distribution equipment having a source connector and a feed connector, wherein
the second circuit further includes a switch connected in series with either the second impedance element or the low-frequency blocking element, and
the switch closes while no wiring is connected to at least one of the source connector and the feed connector, and opens while wiring is connected to each of the source connector and the feed connector.

6. The impedance stabilization device of claim 1, wherein the first impedance element comprises two elements connected in series, and
one end of the second circuit is connected to a point between the two elements.

7. The impedance stabilization device of claim 6, wherein the first circuit is inserted into each of the lines, so that the lines are balanced with respect to a ground.

8. The impedance stabilization device of claim 7, wherein the one end of the second circuit is connected to a point between the two elements of the first impedance element included in the first circuit inserted into one of the lines, and
the other end of the second circuit is connected to a point between the two elements of the first impedance element included in the first circuit inserted into another one of the lines.

9. An impedance stabilization device that is used for power line communication performed by superimposing a high-frequency signal on a power line composed of at least two lines, and is provided in power distribution equipment having a feed connector, the impedance stabilization device comprising:
a first circuit that includes an impedance element, a low-frequency blocking element and a switch connected in series, and via which the lines are connected; and
an impedance upper circuit that is inserted between an equipment connector and the lines, wherein
the low-frequency blocking element has lower impedance than impedance of the impedance element to the high-frequency signal, and has higher impedance than impedance of the impedance element to one of a low-frequency alternating current and a direct current supplied to the power line,
the impedance upper circuit has impedance that is equal to or higher than characteristic impedance of the lines to the high-frequency signal, and has lower impedance than characteristic impedance of the lines to one of the low-frequency alternating current and the direct current, and
the switch closes while no wiring is connected to the feed connector, and opens while wiring is connected to the feed connector.

10. The impedance stabilization device of claim 9, wherein at least part of the impedance upper circuit doubles as the impedance element.

11. An impedance stabilization device that is used for power line communication performed by superimposing a high-frequency signal on a power line composed of at least two lines, and is provided in power distribution equipment having a source connector and a feed connector, the impedance stabilization device comprising:
a first circuit that includes an impedance element, a low-frequency blocking element and a switch connected in series, and via which the lines are connected; and
an impedance upper circuit that is inserted between an equipment connector and the lines, wherein
the low-frequency blocking element has lower impedance than impedance of the impedance element to the high-frequency signal, and has higher impedance than impedance of the impedance element to one of a low-frequency alternating current and a direct current supplied to the power line,
the impedance upper circuit has impedance that is equal to or higher than characteristic impedance of the lines to the high-frequency signal, and has lower impedance than characteristic impedance of the lines to one of the low-frequency alternating current and the direct current, and
the switch closes while no wiring is connected to at least one of the source connector and the feed connector, and opens while wiring is connected to each of the source connector and the feed connector.

12. The impedance stabilization device of claim 11, wherein
at least part of the impedance upper circuit doubles as the impedance element.

13. An impedance stabilization device used for power line communication performed by superimposing a high-frequency signal on a power line composed of at least two lines, the impedance stabilization device comprising:
a first impedance element that is inserted into at least one of the lines;
a second impedance element that connects the lines;
a high-frequency blocking element that is inserted into at least one of a first line and a second line other than the at least two lines, the first line being connected to the at least one line into which the first impedance element is inserted so as to bridge the first impedance element and to be in parallel with the at least one line into which the first impedance element is inserted, the second line being connected to another line to which the first line is not connected so as to bridge a point where the second impedance element connects to the other line and to be in parallel with the other line to which the first line is not connected; and a low-frequency blocking element that connects the first and second lines, wherein the high-frequency blocking element has higher impedance than impedance of the first impedance element to the high-frequency signal, and has lower impedance than impedance of the first impedance element to one of a low-frequency alternating current and a direct current supplied to the power line, and the low-frequency blocking element has lower impedance than impedance of the second impedance element to the high-frequency signal, and has higher impedance than impedance of the second impedance element to one of the low-frequency alternating current and the direct current.

* * * * *